(12) United States Patent
Yang

(10) Patent No.: US 11,399,026 B2
(45) Date of Patent: Jul. 26, 2022

(54) PERMISSION MANAGEMENT METHOD AND SYSTEM, AND RELATED DEVICE

(71) Applicant: HUAWEI TECHNOLOGIES CO., LTD., Shenzhen (CN)

(72) Inventor: Zongjun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 16/468,742

(22) PCT Filed: Mar. 31, 2017

(86) PCT No.: PCT/CN2017/079156
§ 371 (c)(1),
(2) Date: Jun. 12, 2019

(87) PCT Pub. No.: WO2018/107617
PCT Pub. Date: Jun. 21, 2018

(65) Prior Publication Data
US 2019/0319956 A1    Oct. 17, 2019

(30) Foreign Application Priority Data

Dec. 12, 2016 (CN) .......................... 201611142059.X

(51) Int. Cl.
*H04L 29/06* (2006.01)
*H04L 9/40* (2022.01)
(Continued)

(52) U.S. Cl.
CPC .............. *H04L 63/10* (2013.01); *H04W 12/08* (2013.01); *H04W 12/63* (2021.01)

(58) Field of Classification Search
CPC . H04W 12/08; H04W 12/084; H04W 12/086; H04W 4/02; H04W 2/63; H04L 63/10
(Continued)

(56) References Cited

U.S. PATENT DOCUMENTS

2011/0244837 A1    10/2011 Murata et al.
2013/0347096 A1    12/2013 Lee
(Continued)

FOREIGN PATENT DOCUMENTS

CN            101848237 A    9/2010
CN            103491539 A    1/2014
(Continued)

*Primary Examiner* — Tu T Nguyen
(74) *Attorney, Agent, or Firm* — Hauptman Ham, LLP

(57) ABSTRACT

Embodiments relate to a permission management method and system. The method includes: receiving a first request sent by a controlled device. The first request includes a device identifier of the controlled device and indication information of a target operation; detecting a network status of a controlling device associated with the controlled device, where when the controlling device is in different network statuses, one or more controlled devices have different permission for performing respective operations; determining, based on the network status of the controlling device, the device identifier of the controlled device, and the indication information of the target operation, permission for performing the target operation by the controlled device; and processing the first request based on the determined permission for performing the target operation by the controlled device. The embodiments avoid some unpredictable consequences caused by misoperation or an operation with inappropriate permission performed on the controlled device.

14 Claims, 20 Drawing Sheets

(51) Int. Cl.
*H04W 12/08* (2021.01)
*H04W 12/63* (2021.01)

(58) Field of Classification Search
USPC .............................................. 726/4
See application file for complete search history.

(56) References Cited

U.S. PATENT DOCUMENTS

2016/0086483 A1    3/2016  Hong et al.
2016/0255096 A1*   9/2016  Connor ................ H04L 63/105
                                                              726/4

FOREIGN PATENT DOCUMENTS

| CN | 104283745  A  | 1/2015 |
| CN | 104852990  A  | 8/2015 |
| CN | 104935572  A  | 9/2015 |
| CN | 105785776  A  | 7/2016 |
| CN | 105867141  A  | 8/2016 |
| WO | 2005031544 A2 | 4/2005 |

* cited by examiner

PERMISSION MANAGEMENT METHOD AND SYSTEM, AND RELATED DEVICE

CROSS-REFERENCE TO RELATED APPLICATIONS

This application is a National Stage of International Patent Application No. PCT/CN2017/079156, filed on Mar. 31, 2017, which claims the priority to Chinese Patent Application No. 201611142059.x, filed on Dec. 12, 2016, both of which are hereby incorporated by reference in their entireties.

TECHNICAL FIELD

The present invention relates to the field of communications technologies, and in particular, to a permission management method and system, and a related device.

BACKGROUND

As smart devices emerge and networks are constantly developing, many smart devices, such as, smart cameras, smart televisions, smart refrigerators, mobile phones, and tablets emerge on the market, and are widely applied to a smart household scenario. Because smart household includes many smart devices, for ease of management, control between smart devices is mostly used at present. To be specific, a user controls a smart device in smart household by using a controlling device, so that the smart device performs a corresponding operation.

However, it is found in practice that in some special application scenarios, for example, a child may operate a smart device in smart household at will without parental control, and some unpredictable consequences may be caused, for example, inappropriate network information is accessed. Therefore, how to manage operation permission of a smart device has become a problem that urgently needs to be resolved currently.

SUMMARY

Embodiments of the present invention disclose a permission management method and system, and a related device, to smartly manage operation permission of a controlled device, and avoid some unpredictable consequences caused by a misoperation or an operation with inappropriate permission performed by a user on a controlled device.

According to a first aspect, an embodiment of the present invention provides a permission management method, including:

receiving, by a management device, a first request sent by a controlled device, where the first request includes a device identifier of the controlled device and indication information of a target operation;

detecting, by the management device, a network status of a controlling device associated with the controlled device, where when the controlling device is in different network statuses, the controlled device has different permission for performing the target operation;

determining, by the management device based on the network status of the controlling device, the device identifier of the controlled device, and the indication information of the target operation, permission for performing the target operation by the controlled device; and processing, by the management device, the first request based on the determined permission for performing the target operation by the controlled device.

Specifically, the target operation is an operation that the controlled device intends to perform, for example, a network access operation. The permission may be indicated in a plurality of forms. For example, permission for starting a washing machine may be indicated by a definite identifier bit (for example, 1-bit yes/no). Permission for accessing a website or an application program may be indicated by a legal list or an illegal list, that is, a first application program list or a first website list in the following embodiments. Permission for adjusting a volume of a sound box may be indicated by a volume adjustment range, or other factors that are used to affect an operation, for example, duration, a range, and a degree. Operations corresponding to different controlled devices usually are also different. A refrigerator may perform a cooling operation, and a bulb may perform a lighting operation. In execution of the foregoing steps, permission of the controlled device can be smartly managed, and some unpredictable consequences caused by a misoperation or an operation with inappropriate permission performed by a user on the controlled device can be avoided.

In some optional embodiments, the processing, by the management device, the first request based on the determined permission for performing the target operation by the controlled device specifically includes: notifying, by the management device, the controlled device of the permission for performing the target operation by the controlled device.

In execution of the foregoing steps, the management device may notify, in a message form, the controlled device of the permission for performing the target operation by the controlled device, so that the controlled device performs the target operation based on the permission for the target operation.

In some optional embodiments, the processing, by the management device, the first request based on the determined permission for performing the target operation by the controlled device specifically includes: sending, by the management device, a control instruction to the controlled device based on the determined permission for performing the target operation by the controlled device.

In execution of the foregoing steps, after determining the permission for performing the target operation by the controlled device, the management device may send a control instruction to the controlled device, so that the controlled device performs the target operation in response to the control instruction and based on the permission for the target operation. For example, when determining that the controlled device has permission for accessing the Huawei website, the management device may send a corresponding Huawei website access instruction (that is, a control instruction) to the controlled device, so that after receiving the Huawei website access instruction, the controlled device accesses the Huawei website by using a processor.

In some optional embodiments, the determining, by the management device based on the network status of the controlling device, the device identifier of the controlled device, and the indication information of the target operation, permission for performing the target operation by the controlled device specifically includes: determining, by the management device based on the device identifier of the controlled device and the network status of the controlling device, permission for various operations corresponding to the controlled device when the controlling device is in the network status; and determining, by the management device in the permission for the various operations corresponding to the controlled device and based on the indication information of the target operation, the permission for performing the target operation by the controlled device when the controlling device is in the network status.

In execution of the foregoing steps, the management device may determine, based on three factors: the network status of the controlling device, the device identifier of the controlled device, and the indication information of the target operation, the permission for performing the target operation by the controlled device when the controlling device is in the network status.

In some optional embodiments, the determining, by the management device based on the network status of the controlling device, the device identifier of the controlled device, and the indication information of the target operation, permission for performing the target operation by the controlled device specifically includes: determining, by the management device based on the device identifier of the controlled device and the indication information of the target operation, different permission for performing the target operation by the controlled device when the controlling device is in different network statuses; and determining, by the management device in the different permission for performing the target operation by the controlled device and based on the network status of the controlling device, the permission for performing the target operation by the controlled device when the controlling device is in the network status.

In execution of the foregoing steps, the management device may determine, based on three factors: the network status of the controlling device, the device identifier of the controlled device, and the indication information of the target operation, the permission for performing the target operation by the controlled device when the controlling device is in the network status.

In some optional embodiments, the target operation is a website access operation, the indication information of the target operation includes identification information of a to-be-accessed website, and permission for performing the website access operation by the controlled device is represented by a first website list; and the determining, by the management device in the permission for performing the various operations by the controlled device and based on the indication information of the target operation, the permission for performing the target operation by the controlled device when the controlling device is in the network status includes: determining, by the management device based on the identification information of the to-be-accessed website and the first website list, permission for accessing the to-be-accessed website by the controlled device when the controlling device is in the network status, where the first website list is used to indicate a website that the controlled device is allowed to access when the controlling device is in the network status, or a website that the controlled device is forbidden to access when the controlling device is in the network status.

In execution of the foregoing steps, in a website access application scenario, the permission for accessing the to-be-accessed website by the controlled device may be determined by using the first website list. The first website list herein indicates permission for various website accesses corresponding to the controlled device when the controlling device is in the network status. For example, the first website list is a legal website list, used to indicate a website that the controlled device is allowed to access; or the first website list is an illegal website list, used to indicate a website that the controlled device is forbidden to access.

In some optional embodiments, the determining, by the management device based on the first website list corresponding to the controlled device, permission for accessing the to-be-accessed website by the controlled device specifically includes: if the to-be-accessed website belongs to the first website list, determining that the controlled device is allowed to access the to-be-accessed website, where the first website list is used to indicate a website that the controlled device is allowed to access when the controlling device is in the network status; or if the to-be-accessed website does not belong to the first website list, determining that the controlled device is allowed to access the to-be-accessed website, where the first website list is used to indicate a website that the controlled device is forbidden to access when the controlling device is in the network status.

In execution of the foregoing steps, regardless of whether the first website list is a legal list or an illegal list, it is determined whether the to-be-accessed website is in the first website list, so that it may be determined whether the controlled device is allowed to access the to-be-accessed website, to determine the permission for accessing the to-be-accessed website by the controlled device.

In some optional embodiments, the target operation is an application program control operation, the indication information of the target operation includes identification information of a to-be-controlled application program, and permission for performing the application program control operation by the controlled device is represented by a first application program list; and the determining, by the management device in the permission for performing the various operations by the controlled device and based on the indication information of the target operation, the permission for performing the target operation by the controlled device when the controlling device is in the network status includes: determining, by the management device based on the identification information of the to-be-controlled application program and the first application program list, permission for controlling the to-be-controlled application program by the controlled device when the controlling device is in the network status, where the first application program list is used to indicate an application program that the controlled device is allowed to control when the controlling device is in the network status, or an application program that the controlled device is forbidden to control when the controlling device is in the network status.

In execution of the foregoing steps, in an application program control application scenario, the permission for controlling the to-be-controlled application program by the controlled device may be determined by using the first application program list. The first application program list herein indicates permission for various application program control operations corresponding to the controlled device. For example, the first application program list is a legal application program list, used to indicate an application program that the controlled device is allowed to control; or the first application program list is an illegal application program list, used to indicate an application program that the controlled device is forbidden to control. The permission for the to-be-controlled application program herein may be permission for allowing or forbidding the controlled device to use the to-be-controlled application program, or may indicate duration for using the to-be-controlled application program, for example, duration for using the QQ application program, or indicate some functional operations performed by the to-be-controlled application program, for example, adjusting a volume range and a volume value of a sound box by using the application program.

In some optional embodiments, the determining, by the management device based on the identification information of the to-be-controlled application program and the first application program list, permission for controlling the to-be-controlled application program by the controlled device when the controlling device is in the network status specifically includes: if the to-be-accessed website belongs to the first application program list, determining that the controlled device is allowed to control the to-be-controlled application program, where the first application program list is used to indicate an application program that the controlled device is allowed to control when the controlling device is in the network status; or if the to-be-accessed website does not belong to the first application program list, determining that the controlled device is allowed to control the to-be-controlled application program, where the first application program list is used to indicate an application program that the controlled device is forbidden to control when the controlling device is in the network status.

In execution of the steps in the foregoing embodiments, regardless of whether the first application program list is a legal list or an illegal list, it is determined whether the to-be-controlled application program is in the first application program list, so that it may be determined whether the controlled device is allowed to control the to-be-controlled application program, to determine the permission for controlling the to-be-controlled application program by the controlled device.

In some optional embodiments, the target operation is a device function control operation, and the indication information of the target operation includes identification information of a to-be-controlled device function; and the determining, by the management device in the permission for performing the various operations by the controlled device and based on the indication information of the target operation, the permission for performing the target operation by the controlled device when the controlling device is in the network status includes: determining, by the management device based on the identification information of the to-be-controlled device function and permission for various functions corresponding to the controlled device, permission for controlling the to-be-controlled device function by the controlled device when the controlling device is in the network status.

In execution of the foregoing steps, in a device function control application scenario, the permission for controlling the to-be-controlled device function by the controlled device may be determined based on permission for various functions corresponding to the controlled device. Specifically, the permission for controlling the to-be-controlled device function by the controlled device may alternatively be determined with reference to a time of the to-be-controlled device function. The permission for the to-be-controlled device function herein may indicate enabling or disabling the to-be-controlled device function of the controlled device, or may indicate an adjustment range, operation duration, an operation degree, and the like of the to-be-controlled device function, for example, television watching duration and a volume adjustment range.

In some optional embodiments, the detecting a network status of a controlling device associated with the controlled device specifically includes: determining whether a frequency at which the controlling device sends a heartbeat packet exceeds a preset threshold; if yes, determining that the network status of the controlling device associated with the controlled device is an online state; or if not, determining that the network status of the controlling device associated with the controlled device is an offline state.

In execution of the foregoing steps, the management device may determine whether a frequency at which the controlling device sends a heartbeat packet exceeds a preset threshold, to determine whether the network status of the controlling device is an online state or an offline state, so that the management device subsequently determines the permission for performing the target operation by the controlled device when the controlling device is in the network status.

In some optional embodiments, when the management device supports a short-distance wireless communication protocol, the detecting a network status of a controlling device associated with the controlled device specifically includes: performing device scanning based on the short-distance wireless communication protocol, and generating a connected device list based on a device obtained by scanning; determining whether the controlling device associated with the controlled device is in the connected device list; and if yes, determining that the network status of the controlling device associated with the controlled device is an online state; or if not, determining that the network status of the controlling device associated with the controlled device is an offline state.

In execution of the foregoing steps, the management device performs device scanning by using the short-distance wireless communication protocol, to obtain the corresponding connected device list, and detects whether the controlling device is in the connected device list, to determine whether the network status of the controlling device is the online state or the offline state, so that the management device subsequently determines the permission for performing the target operation by the controlled device when the controlling device is in the network status.

In some embodiments, the detecting a network status of a controlling device associated with the controlled device specifically includes: polling to determine whether the controlling device associated with the controlled device is in a current networked device list; and if yes, determining that the network status of the controlling device associated with the controlled device is an online state; or if not, determining that the network status of the controlling device associated with the controlled device is an offline state.

In execution of the foregoing steps, when the management device is a device having a network connection detection function such as a router, a gateway, or a switch, the management device may detect, by using a polling mechanism, whether the controlling device is in the current networked device list of the management device, to determine whether the network status of the controlling device is the online state or the offline state, so that the management device subsequently determines the permission for performing the target operation by the controlled device when the controlling device is in the network status.

In some optional embodiments, the method further includes: preconfiguring, in the management device, the controlling device, the one or more controlled devices, and permission for performing respective operations by the one or more controlled devices when the controlling device is in different network statuses. Specifically, when the controlling device is in different statuses, permission for a same operation corresponding to the controlled device may be the same or different.

In execution of the foregoing steps, the permission for performing the respective operations by the one or more controlled devices when the controlling device is in different network statuses may be preconfigured in the management device, so that the management device subsequently determines, based on the network status of the controlling device, the device identifier of the controlled device, and the indication information of the target operation, the permission for performing the target operation by the controlled device.

According to a second aspect, an embodiment of the present invention provides a management device, including functional units configured to perform the method according to the first aspect.

According to a third aspect, an embodiment of the present invention provides a management device, including a touchscreen, a receiver, and a processor, where the touchscreen is configured to receive first information entered by a user, where the first information is used to configure a controlling device and one or more controlled devices, and when the controlling device is in different network statuses, the one or more controlled devices perform permission for respective operations;

the receiver is configured to receive a first request sent by the controlled device, where the first request includes a device identifier of the controlled device and indication information of a target operation;

the processor is configured to detect a network status of the controlling device associated with the controlled device, where when the controlling device is in different network statuses, the controlled device has different permission for performing the target operation;

the processor is further configured to determine, based on the network status of the controlling device, the device identifier of the controlled device, and the indication information of the target operation, permission for performing the target operation by the controlled device; and the processor is further configured to process the first request based on the determined permission for performing the target operation by the controlled device.

With reference to the third aspect, in some optional embodiments, the management device further includes a transmitter, configured to: after the permission for performing the target operation by the controlled device is determined, notify the controlled device of the permission for performing the target operation by the controlled device.

With reference to the third aspect, in some optional embodiments, the management device further includes a transmitter, configured to: after the processor determines the permission for performing the target operation by the controlled device, send a control instruction to the controlled device based on the determined permission for performing the target operation by the controlled device.

According to a fourth aspect, an embodiment of the present invention provides a management device, including a receiver and a processor, where the receiver is configured to receive a first request sent by a controlled device, where the first request includes a device identifier of the controlled device and indication information of a target operation;

the processor is configured to detect a network status of a controlling device associated with the controlled device, where when the controlling device is in different network statuses, the controlled device has different permission for performing the target operation;

the processor is further configured to determine, based on the network status of the controlling device, the device identifier of the controlled device, and the indication information of the target operation, permission for performing the target operation by the controlled device; and the processor is further configured to process the first request based on the determined permission for performing the target operation by the controlled device.

With reference to the fourth aspect, in some optional embodiments, the management device further includes a transmitter, configured to: after the processor determines the permission for performing the target operation by the controlled device, notify the controlled device of the permission for performing the target operation by the controlled device.

With reference to the fourth aspect, in some optional embodiments, the management device further includes a transmitter, configured to: after the processor determines the permission for performing the target operation by the controlled device, send a control instruction to the controlled device based on the determined permission for performing the target operation by the controlled device.

According to a fifth aspect, a computer-readable storage medium is provided. The computer-readable storage medium stores program code for permission management. The program code includes an instruction used to perform the method according to the first aspect.

According to a sixth aspect, a permission management system is provided, including a management device and a controlled device, where the management device may be the management device according to any one of the second aspect to the fourth aspect; and the controlled device is configured to: send a first request to the management device, where the first request includes a device identifier of the controlled device and indication information of a target operation, to request permission for instructing the controlled device to perform the target operation; and receive the permission for performing the target operation by the controlled device that is notified by the management device, or receive a control instruction sent by the management device and perform the target operation in response to the control instruction and based on the permission for the target operation.

In some embodiments, the permission management system further includes a controlling device. The controlling device is configured to periodically send a heartbeat packet to the management device, so that the management device detects whether the heartbeat packet sent by the controlling device is received within preset duration, to determine the network status of the controlling device.

In execution of the foregoing steps, the controlling device periodically sends a heartbeat packet to the management device, to report that the network status of the controlling device is an online (networked) state, so that the management device subsequently determines the permission for performing the target operation by the controlled device when the controlling device is in the network status.

During implementation of the embodiments of the present invention, operation permission of the controlled device can be smartly managed, and some unpredictable consequences caused by a misoperation or an operation with inappropriate permission performed by a user on the controlled device can be avoided. For example, a child is prevented from accessing some inappropriate network information by accessing a network using the controlled device without adult control, thereby improving network use security of a device.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the technical solutions in the embodiments of the present invention in detail with reference to the accompanying drawings in the present invention.

Figure 1:
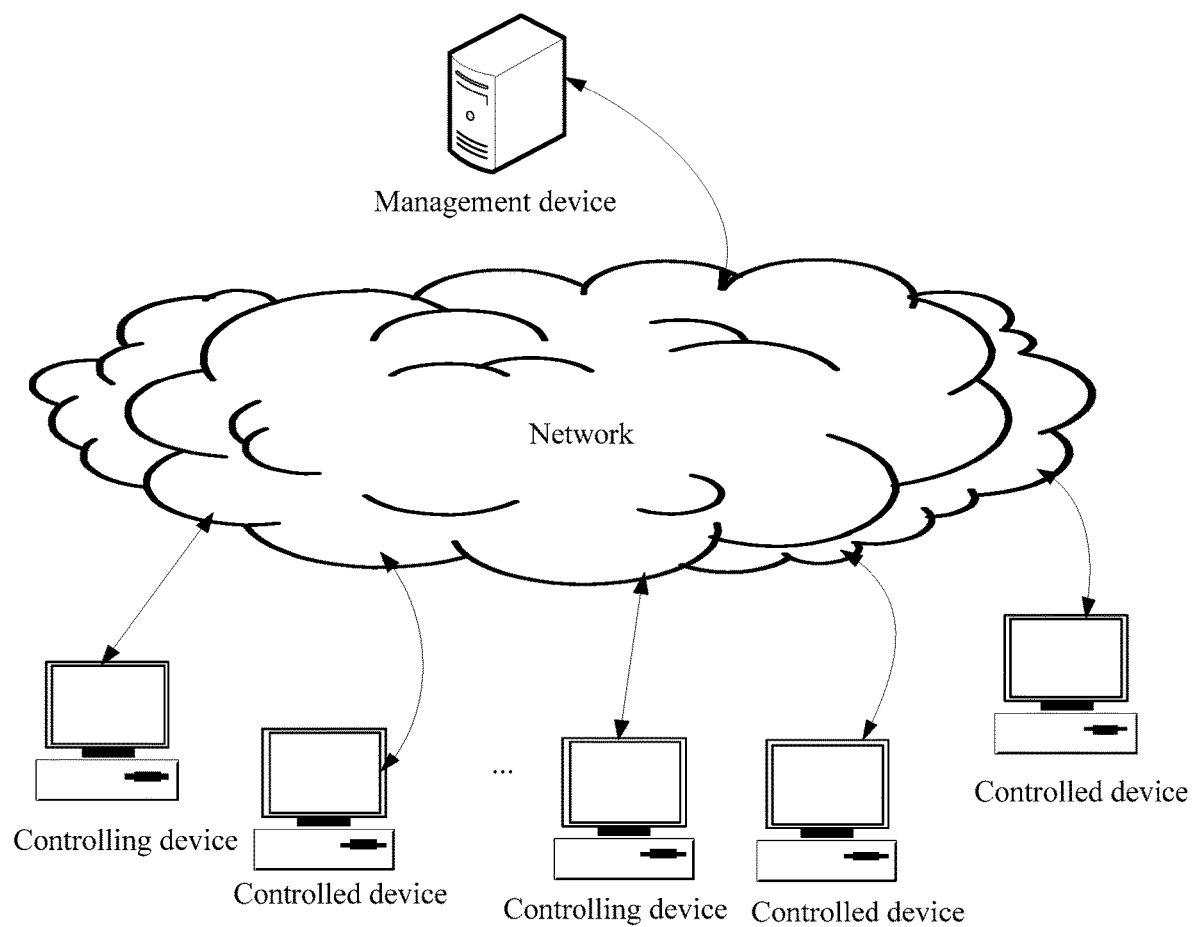
FIG. 1 is a schematic diagram of a network architecture according to an embodiment of the present invention.

FIG. 1 is a schematic diagram of a network architecture according to an embodiment of the present invention. The schematic diagram of the network framework includes a controlling device, a controlled device, and a management device. There may be one or more controlling devices, controlled devices, and management devices. When there are two or more controlling devices, controlled devices, and management devices, the controlling devices, the controlled devices, and the management devices may be devices of a same type or may be different devices.

In this application, the controlling device, the controlled device, and the management device may be in a same network, or may be in different networks, and may communicate with each other through a network. The network includes any one of a local area network, a metropolitan area network, and a wide area network. The controlled device is controlled by the controlling device, and a same controlling device may control one or more controlled devices.

In this application, the controlled device may include a smart household device, for example, a smart refrigerator, a smart television set, a smart bulb, or a smart curtain, or may include an Internet device, for example, a smartphone, a mobile Internet device (MID, Mobile Internet Device) or a wearable smart device. The controlling device may include a smart terminal device, for example, a smartphone, a personal computer, a tablet computer, or a wearable smart device. The management device may include a network side device, for example, a server or a router, or may include a smart terminal device, for example, a smartphone, a personal computer, a tablet computer, or a wearable smart device.

In an actual application, for example, in a smart household application scenario, a user may deploy a mobile Internet device such as a mobile phone, a tablet, or a computer as the controlling device. The user may deploy a smart household appliance device such as a smart refrigerator, a smart television, a smart lamp, or a smart door lock as the controlled device. The user may deploy an Internet device such as a central controller or a server (a smart computer/a host) in smart household as the management device. For example, the user sets a smart computer in smart household as the management device, sets a portable mobile phone of the user as the controlling device, and sets another device in smart household, for example, a smart device such as a television or a smart air conditioner as the controlled device controlled by the mobile phone used as the controlling device. To be specific, the user may control the controlled device to perform a corresponding permitted operation by using the mobile phone.

The schematic diagram of the network architecture shown in FIG. 1 may also be a schematic structural diagram of a permission management system disclosed in an embodiment of the present invention. The permission management system includes a management device, a controlling device, and a controlled device, and may be configured to perform some or all steps in the following related method embodiments in FIG. 5 to FIG. 15.

Figure 2:
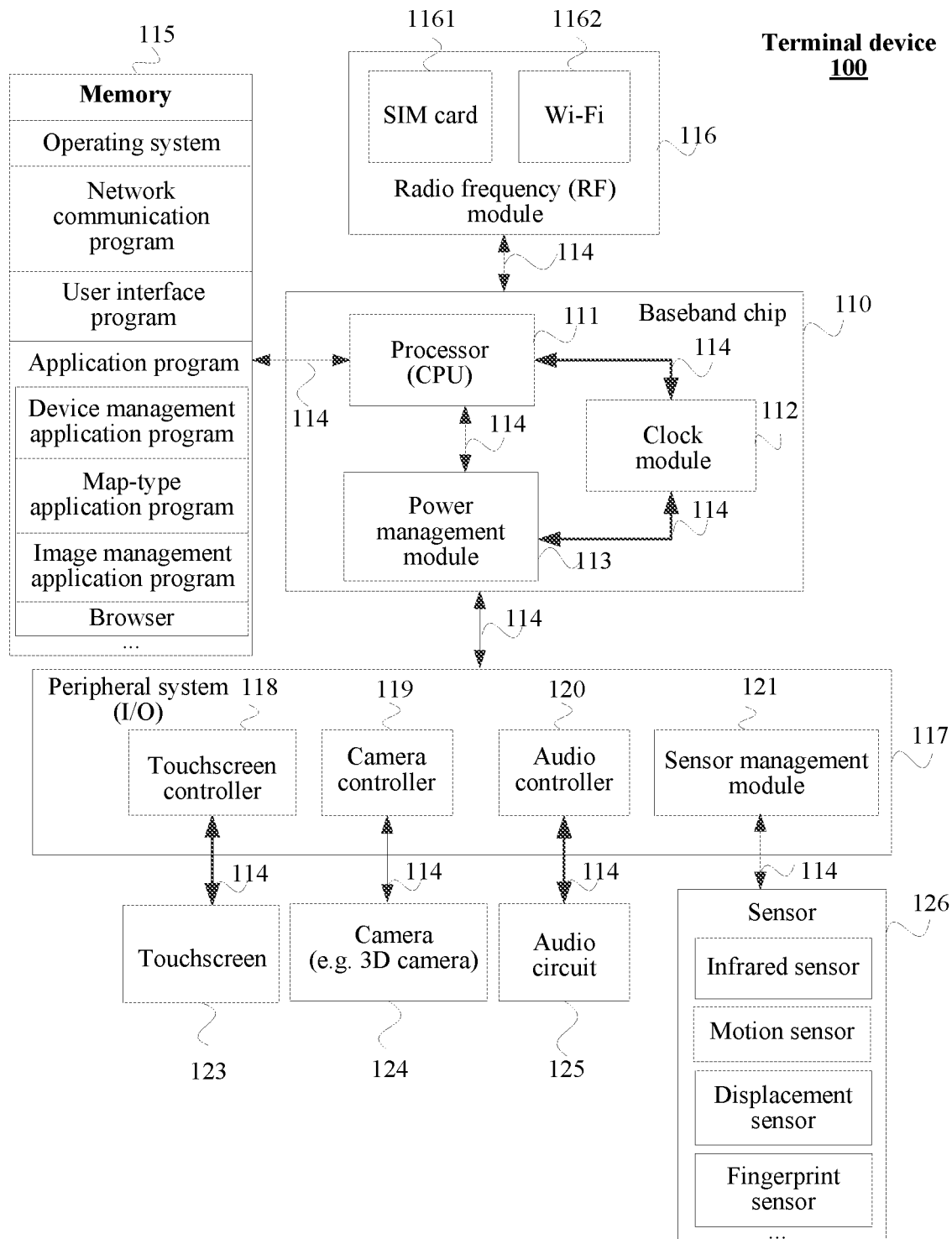
FIG. 2 is a schematic structural diagram of a terminal device according to an embodiment of the present invention.

FIG. 2 is a schematic structural diagram of a terminal device according to an embodiment of the present invention. The terminal device may be implemented as the management device, the controlling device, or the controlled device in this application. The terminal device 100 may include: a baseband chip 110, a memory 115 (one or more computer-readable storage media), a radio frequency (RF) module 116, and a peripheral system 117. These components may communicate on one or more communications buses 114.

The peripheral system 117 is mainly configured to implement a function of interaction between the terminal device 100 and a user/an external environment, and includes an input/output apparatus of the terminal device 100. In some embodiments, the peripheral system 117 may include: a touchscreen controller 118, a camera controller 119, an audio controller 120, and a sensor management module 121. Each controller may be coupled to a peripheral device (for example, a touchscreen 123, a camera 124, an audio circuit 125, and a sensor 126) corresponding to the controller. In some embodiments, the camera 124 may be a 3D camera. It should be noted that, the peripheral system 117 may further include another I/O peripheral device.

The touchscreen 123 may be configured to display first information entered by a user or display first information to a user, for example, may display various menus of the terminal device 100 and display an interface of an application program that is running, for example, a button (Button), a text input box (Text), a scroll bar (Scroll Bar), and a menu (Menu). The touchscreen 123 may include a touch panel and a display panel. Optionally, the display panel may be configured in a form of a liquid crystal display (English: Liquid Crystal Display, LCD for short) or an organic light-emitting diode (English: Organic Light-Emitting Diode, OLED for short). Further, the touch panel may cover the display panel. After detecting a touch operation on or near the touch panel, the touch panel transfers the touch operation to the processor 111, to determine a type of the touch event. Then, the processor 111 provides a corresponding visual output according to the type of the touch event. The touch panel and the display panel implement input and output functions of the terminal device 100 as two independent components. However, in some embodiments, the touch panel and the display panel may be integrated to implement the input and output functions of the terminal device 100.

One or more processors 111, a clock module 112, and a power management module 113 may be integrated into the baseband chip 110. The clock module 112 integrated into the baseband chip 110 is mainly configured to generate, for the processor 111, a clock required by data transmission and time sequence control. The power management module 113 integrated into the baseband chip 110 is mainly configured to provide a stable and highly precise voltage for the processor 111, the radio frequency module 116, and the peripheral system.

The radio frequency (RF) module 116 is configured to receive and send a radio frequency signal, and mainly integrates a receiver and a transmitter of the terminal 100. The radio frequency (RF) module 116 communicates with a communications network and another communications device by using the radio frequency signal. In some embodiments, the radio frequency module 116 may include, but is not limited to: an antenna system, an RF transceiver, one or more amplifiers, a tuner, one or more oscillators, a digital signal processor, a CODEC chip, a SIM card, a storage medium, and the like. In some embodiments, the radio frequency (RF) module 116 may be implemented on an independent chip. Generally, wireless transmission, for example, Bluetooth (English: Bluetooth) transmission, wireless fidelity (English: Wireless-Fidelity, WI-FI for short) transmission, the third-generation mobile communications technology (English: 3rd-Generation, 3G for short) transmission, and the fourth-generation mobile communications technology (English: the 4th Generation mobile communication, 4G for short) transmission may be performed by using the radio frequency module B03.

The memory 115 is coupled to the processor 111, and is configured to store various software programs and/or a plurality of sets of instructions. In some embodiments, the memory 115 may include a high-speed random access memory, and may also include a non-volatile memory, for example, one or more magnetic disk storage devices, a flash memory device, or another non-volatile solid-state storage device. The memory 115 may store an operating system (briefly referred to as a system below), for example, an embedded operating system such as Android, iOS, Windows, or Linux. The memory 115 may further store a network communications program, and the network communications program may be configured to communicate with one or more adjuncts, one or more terminal devices, and one or more network devices. The memory 115 may further store a user interface program, and the user interface program may vividly display content of an application program by using a graphical operation interface, and receive a control operation of the user for the application program by using input controls such as a menu, a dialog box, and a key. The memory 115 may further store an instruction of a method in the embodiments of the present invention, so that the processor 111 reads the instruction stored in the memory 115, and performs, based on the instruction, the method disclosed in the embodiments of this application.

The memory 115 may further store one or more application programs. As shown in FIG. 2, the application programs may include: a device management application program, a social application program (for example, Facebook), an image management application program (for example, an album), a map-type application program (for example, Google map), a browser (for example, Safari and Google Chrome), and the like.

It should be understood that the terminal device 100 is only an example provided in this embodiment of the present invention, and the terminal device 100 may include more or fewer components than those shown, may combine two or more components, or may be implemented in different component configurations.

Figure 3:
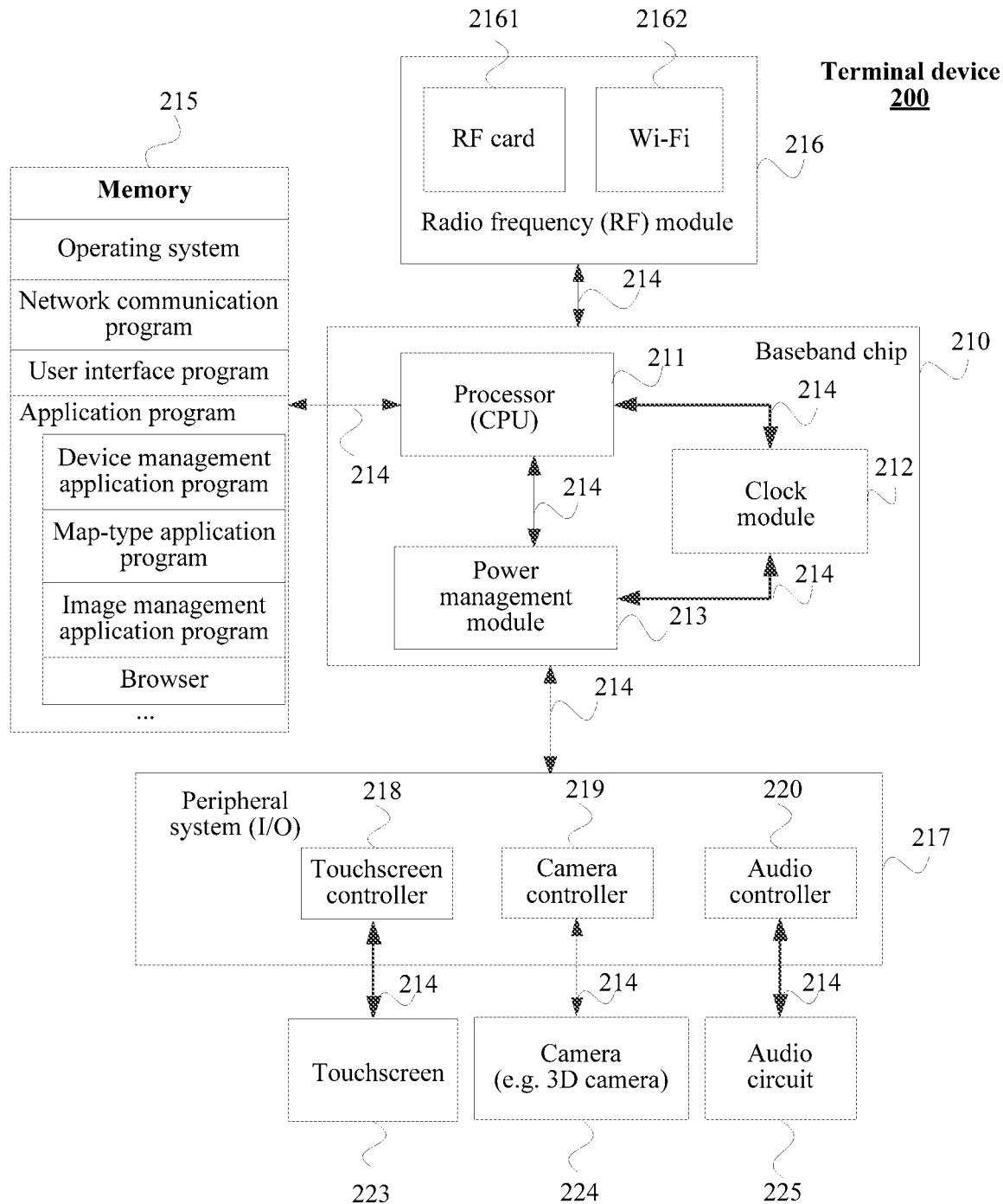
FIG. 3 is a schematic structural diagram of another terminal device according to an embodiment of the present invention.

FIG. 3 is a schematic structural diagram of another terminal device according to an embodiment of the present invention. The terminal device may be implemented as a management device, a controlling device, or a controlled device in this application. The terminal device 200 may include: a baseband chip 210, a memory 215 (one or more computer-readable storage media), a radio frequency (RF) module 216, and a peripheral system 217. These components may communicate on one or more communications buses 114.

The peripheral system 217 is mainly configured to implement a function of interaction between the terminal device 200 and a user/an external environment, and mainly includes an input/output apparatus of the terminal device 200. During specific implementation, the peripheral system 217 may include: a touchscreen controller 218, a camera controller 219, and an audio controller 120. Each controller may be coupled to a peripheral device, for example, a touchscreen 223, a camera 224, and an audio circuit 225 corresponding to the controller. It should be noted that, the peripheral system 217 may further include another I/O peripheral device.

One or more processors 211, a clock module 212, and a power management module 213 may be integrated into the baseband chip 210. The clock module 212 integrated into the baseband chip 210 is mainly configured to generate, for the processor 211, a clock required by data transmission and time sequence control. The power management module 213 integrated into the baseband chip 210 is mainly configured to provide a stable and highly precise voltage for the processor 211, the radio frequency module 216, and the peripheral system.

The touchscreen 223 may be configured to display first information entered by a user or display first information to a user, for example, may display various menus of the terminal device 200 and display an interface of an application program that is running, for example, a button (Button), a text input box (Text), a scroll bar (Scroll Bar), and a menu (Menu). The touchscreen 223 may include a touch panel and a display panel. Optionally, the display panel may be configured in a form of a liquid crystal display (English: Liquid Crystal Display, LCD for short) or an organic light-emitting diode (English: Organic Light-Emitting Diode, OLED for short). Further, the touch panel may cover the display panel. After detecting a touch operation on or near the touch panel, the touch panel transfers the touch operation to the processor 211, to determine a type of the touch event. Then, the processor 211 provides a corresponding visual output according to the type of the touch event. The touch panel and the display panel implement input and output functions of the terminal device 200 as two independent components. However, in some embodiments, the touch panel and the display panel may be integrated to implement the input and output functions of the terminal device 200.

The radio frequency (RF) module 216 is configured to receive and send a radio frequency signal, and mainly integrates a receiver and a transmitter of the terminal 200. The radio frequency (RF) module 216 communicates with a communications network and another communications device by using the radio frequency signal. During specific implementation, the radio frequency (RF) module 216 may include, but is not limited to: an antenna system, an RF transceiver, one or more amplifiers, a tuner, one or more oscillators, a digital signal processor, a CODEC chip, a radio frequency card, a SIM card, a storage medium, and the like. In some embodiments, the radio frequency (RF) module 116 may be implemented on an independent chip.

The memory 215 is coupled to the processor 211, and is configured to store various software programs and/or a plurality of sets of instructions. During specific implementation, the memory 215 may include a high-speed random access memory, and may also include a non-volatile memory, for example, one or more magnetic disk storage devices, a flash memory device, or another non-volatile solid-state storage device. The memory 215 may store an operating system, for example, an embedded operating system such as Android, iOS, Windows, or Linux. The memory 215 may further store a network communications program, and the network communications program may be configured to communicate with one or more adjuncts, one or more terminal devices, and one or more network devices. The memory 215 may further store a user interface program. The user interface program may vividly display content of an application program by using a graphical operation interface, and receive a control operation of the user for the application program by using input controls such as a menu, a dialog box, and a key. The memory 215 may further store an instruction of a method in the embodiments of the present invention, so that the processor 211 reads the instruction stored in the memory 215, and performs, based on the instruction, the method disclosed in the embodiments of this application.

The memory 215 may further store one or more programs. As shown in FIG. 3, the programs may include: a device management application program, a social application program, for example, Facebook, an image management application program, for example, an album, a map-type application program, for example, Google map, and a browser, for example, Safari and Google Chrome, and the like.

It should be understood that the terminal device 200 is only an example provided in this embodiment of the present invention, and the terminal device 200 may include more or fewer components than those shown, may combine two or more components, or may be implemented in different component configurations.

The following describes some embodiments of human-computer interaction in this application.

FIG. 4A to FIG. 4F show several embodiments of human-computer interaction in this application. In the embodiments of the present invention, a human-computer interaction interface may be displayed on a screen of a terminal device. Herein, the terminal device may be a management device, a controlling device, or a controlled device, and the screen may be a touchscreen.

Figure 4A:
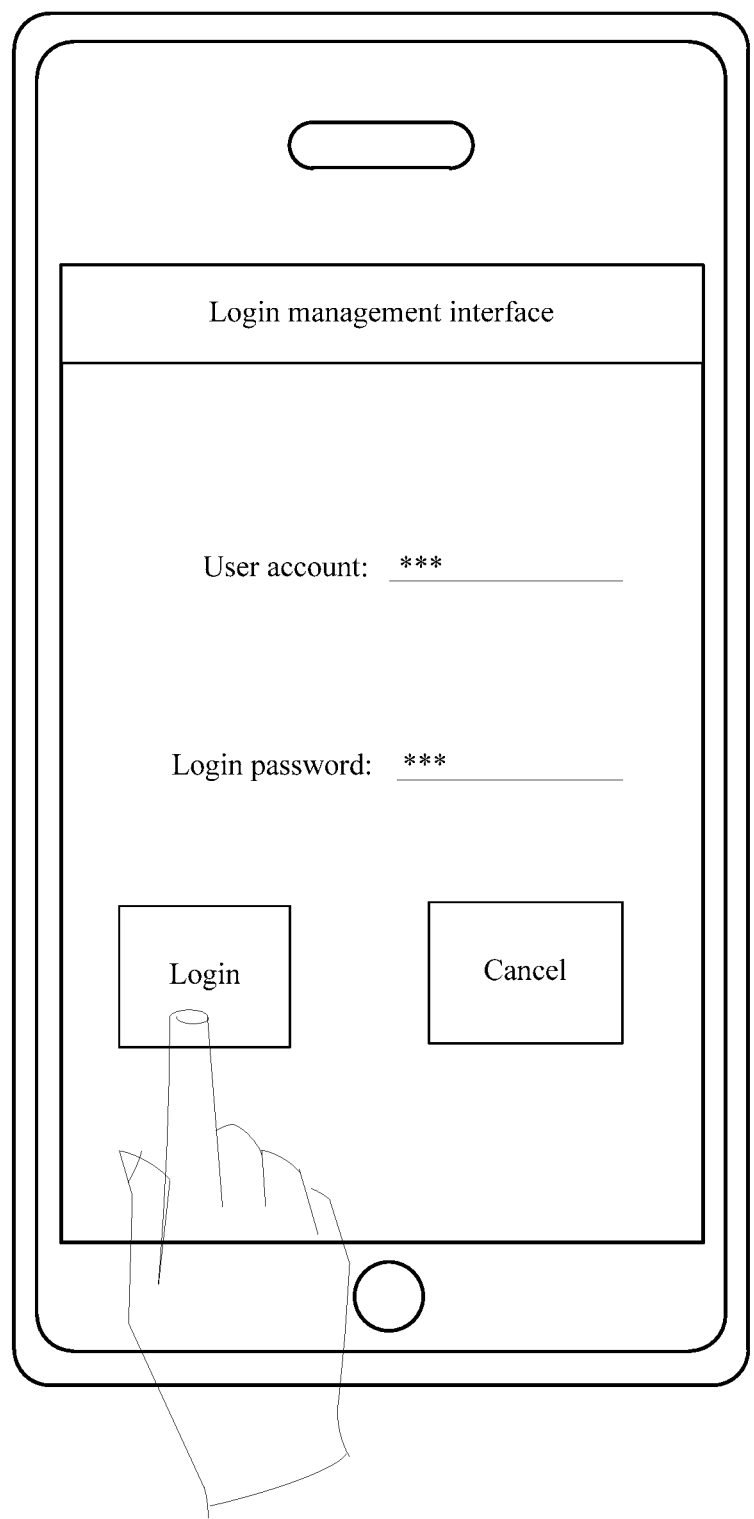
FIG. 4A to FIG. 4F are schematic diagrams of several human-computer interaction interfaces according to embodiments of the present invention.
Figure 4B:
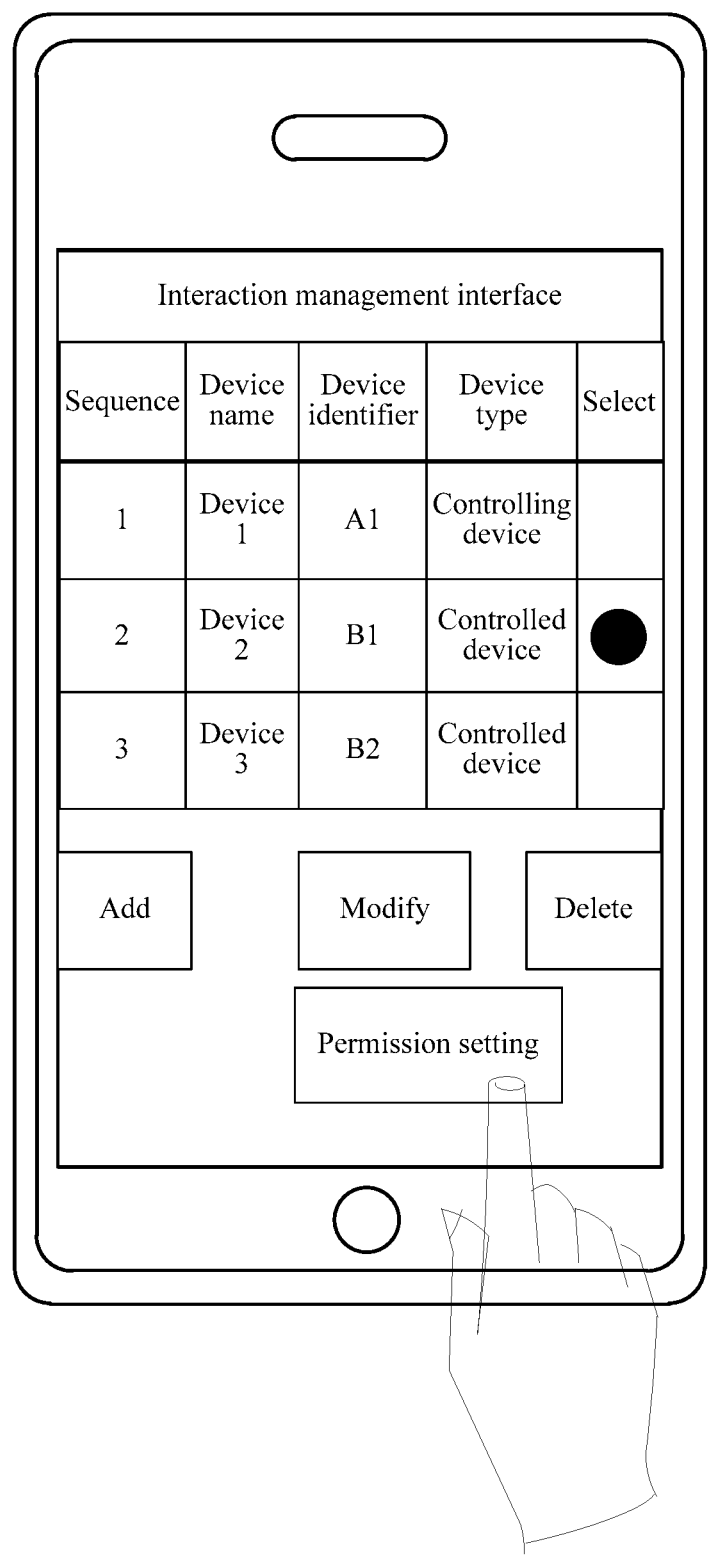
Figure 4C:
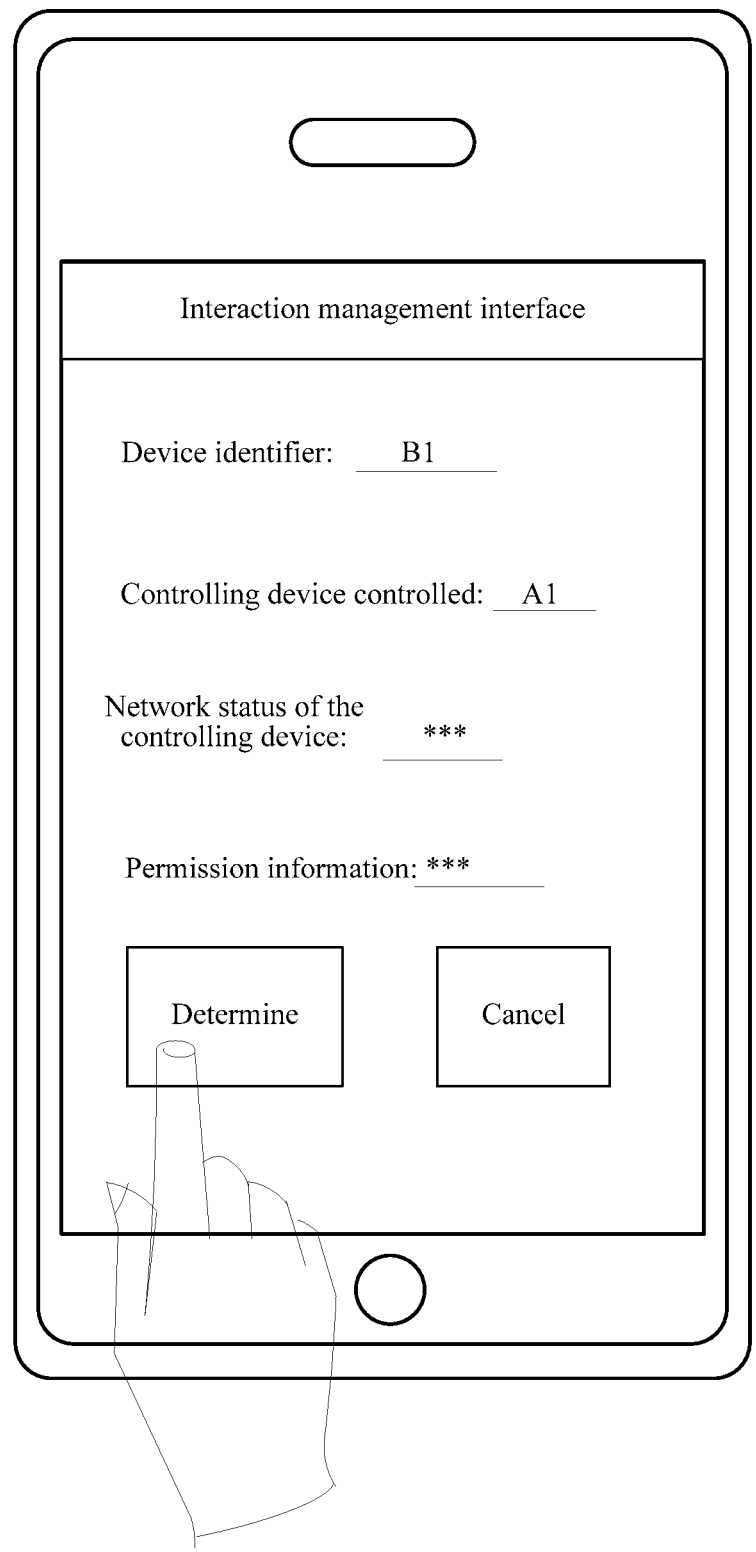

FIG. 4A to FIG. 4C show a process in which a user preconfigures, on a management device, information such as a controlling device, a controlled device, and permission for various operations supported by the controlled device. The information preconfigured by the user may be stored in a database of the management device, so that the management device determines, based on the database, permission for performing a specific operation by the controlled device.

As shown in FIG. 4A, the screen of the terminal device may display a login management interface, and the login management interface includes login information. The login information is a user account, a login password, a login key, and a cancel key shown in the figure. Specifically, the user may input corresponding login information, for example, the user account and the login password on the login management interface and tap the login key. After the login information entered by the user has been authenticated, the terminal device may automatically redirect and display a corresponding interaction management interface on the screen.

As shown in FIG. 4B, the screen of the terminal device may display a device interaction management interface. The interaction management interface includes related interface elements used to set a database. The related interface elements are a sequence number (a device configuration sequence number), a device name, a device identifier, a device type, select, an add key, a modify key, a modify key, and a permission setting key shown in the figure. Specifically, the user may autonomously set, on the interaction management interface, the controlling device and the controlled device, and set, for the controlled device, information such as permission corresponding to some functional operations performed by the controlled device. In some embodiments, the user may further set permission for a corresponding operation for each controlled device or a type of controlled device. As shown in FIG. 4B, the user selects a controlled device 2 and taps the permission setting key, to set, for the controlled device 2, corresponding permission for some or all functional operations supported by the controlled device 2.

As shown in FIG. 4C, after the user taps the permission setting key, the terminal device may display, on the interaction management interface, related operation prompt information used to set corresponding permission for the selected controlled device. For example, as shown in the figure, the interaction management interface includes a device identifier (or a device name), a controlling device controlled (that is, a controlling device corresponding to/associated with the controlled device), a network status of the controlling device (for example, an online state or an offline state), permission setting, a determine key, and a cancel key. Specifically, the user may set, on the interaction management interface for the controlled device 2, permission for performing one or more operations by the controlled device 2, for example, allowed or forbidden to perform the one or more operations. Further, the user may set, based on the network status of the controlling device, the permission for performing the one or more operations by the controlled device 2. For example, when the controlling device is online, the controlled device 2 is allowed to start, and when the controlling device is offline, the controlled device 2 is forbidden to start. After the user completes permission setting corresponding to the controlled device 2, the terminal device may store the permission setting corresponding to the controlled device 2 in the database of the management device.

In this application, the operation performed by the controlled device may include: a network access operation, an application program control operation, a device function control operation, and the like.

Figure 4D:
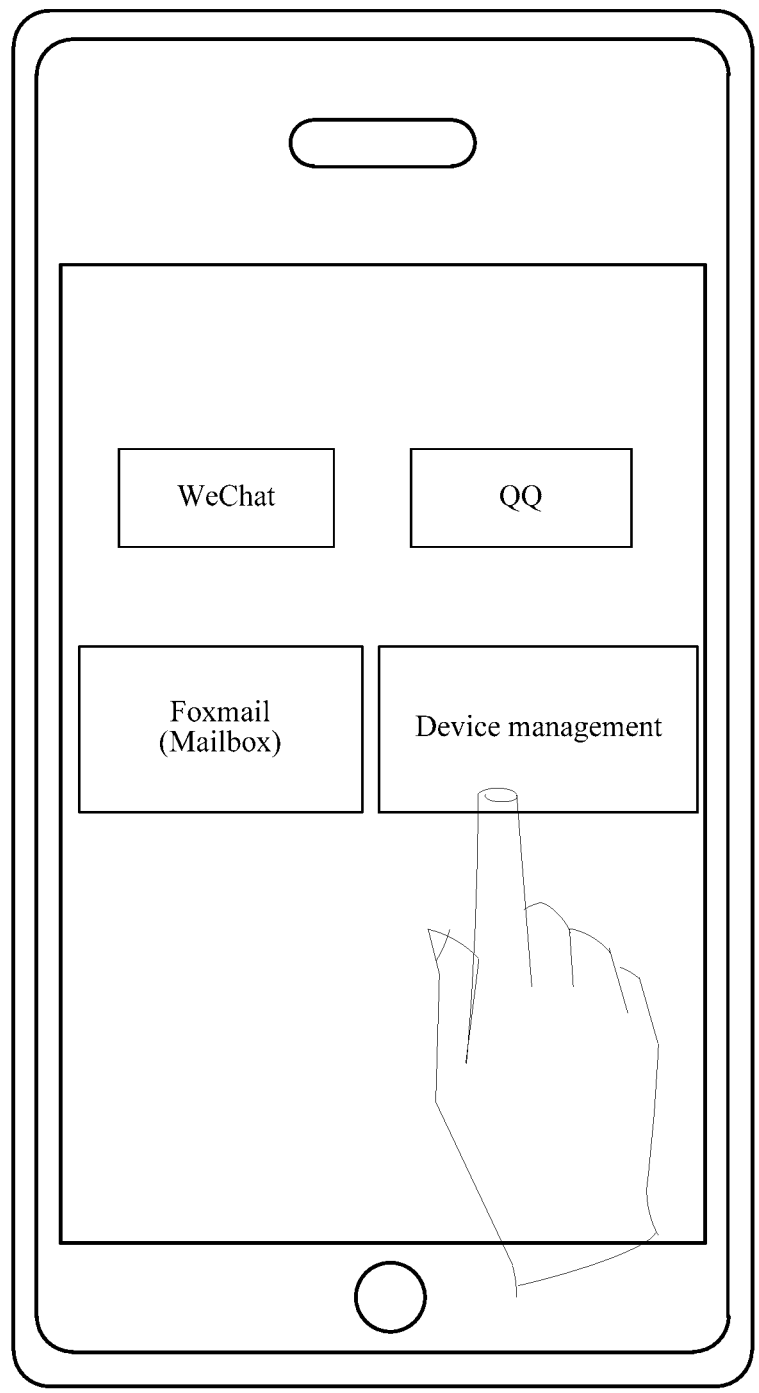

In some embodiments, specific implementations of displaying the login management interface on the screen of the terminal device may include the following three implementations:

In a first implementation, the terminal device installs device management software (app), and may display the device management software to the user on the screen. As shown in FIG. 4D, the user taps the device management software displayed on the screen, to automatically redirect to and display the login management interface.

Figure 4E:
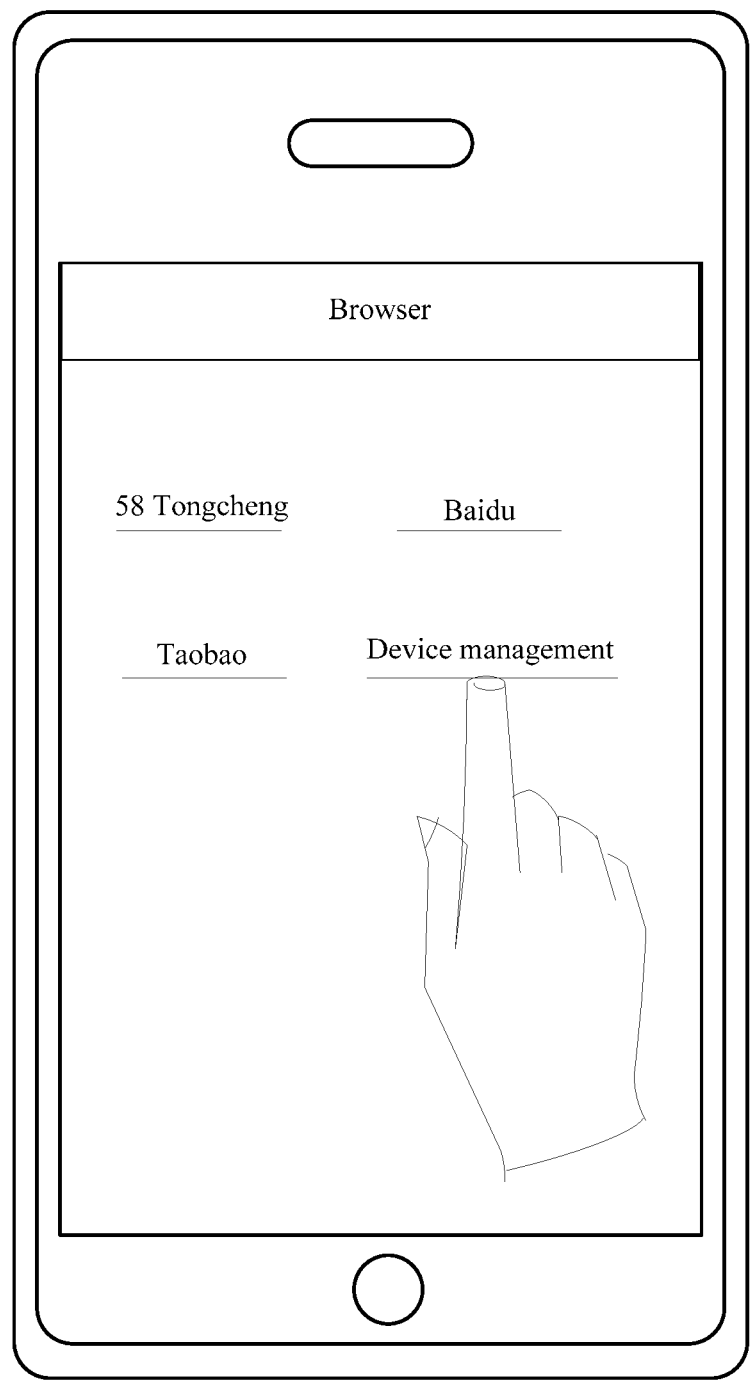

In a second implementation, the terminal device has a link used to link to a device login management system, and the link may also be displayed on the screen to be displayed to the user. As shown in FIG. 4E, the user taps a device management link displayed on the screen, to automatically redirect to and display the login management interface.

Figure 4F:
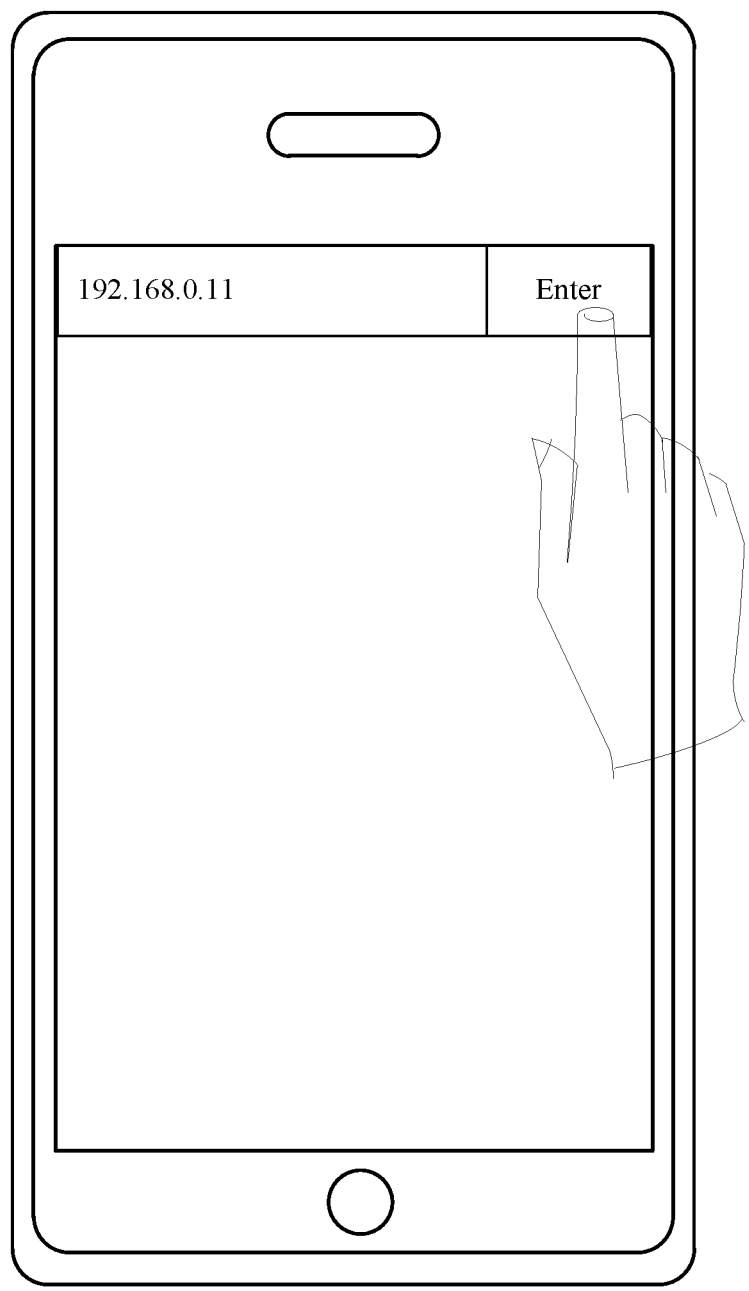

In a third implementation, the terminal device has a URL search box, for example, a website search box in a browser, which may also be displayed to the user on the screen. As shown in FIG. 4F, the user may enter a device management URL (for example, www.serviceset.com or 192.168.0.11) in the URL search box of the terminal device, and tap a search key, to automatically redirect to and display a login management interface.

It should be understood that each device correspondingly has a unique device identifier. Therefore, the device identifier is usually used to indicate the device. Referring to FIG. 4B, for both the controlling device and the controlled device entered by the user, a unique device identifier is used to indicate the device. The device identifier herein may be an SN (Serial Number, Chinese: product serial number), an IMEI (International Mobile Equipment Identity, Chinese: International Mobile Equipment Identity), an MEID (Mobile Equipment Identifier, Chinese: Mobile Equipment Identifier), or another identifier used to indicate a device identity. This is not limited in this embodiment of the present invention.

It should be understood that the database of the management device may include, but is not limited to, information such as the controlling device, the controlled device, and the permission for various operations supported by the controlled device. There may be one or more controlling devices and controlled devices, each controlling device may correspondingly manage one or more controlled devices, and one controlled device is correspondingly controlled by one controlling device. The user may correspondingly set, for each controlled device, permission for an operation supported by the controlled device, or may set, for controlled devices of a same type, permission for various operations supported by the controlled devices. For a same controlled device, permission for a supported operation that is set for the controlled device is related to the network status of the controlling device associated with the controlled device.

In an actual application, when the network status of the controlling device is an online state, permission for performing a first operation by the controlled device is first permission; and when the network status of the controlling device is an offline state, permission for performing the first operation by the controlled device is the first permission, where the first permission is different from the second permission. The first permission and the second permission may be used to indicate whether the controlled device has permission for performing the first operation, or may be used to indicate that when the controlled device performs the first operation, corresponding functional operations of the controlled device are different. For example, operation duration is different, operation ranges are different, operation degrees are different, or temperature adjustment is different, which depends on a specific application scenario. Specifics are described in the following embodiments in detail.

For example, if the controlled device is a smart air conditioner, the first permission configured for a temperature adjustment functional operation of the smart air conditioner may be allowing temperature adjustment of the smart air conditioner from 20° C. to 30° C. However, the second permission configured for a temperature adjustment functional operation of the smart air conditioner may be allowing temperature adjustment of the smart air conditioner from 10° C. to 30° C.

In some embodiments, the user correspondingly sets, for each controlled device, permission for performing various operations by the controlled device, and does not further set/limit the network status of the controlling device associated with an effect of the permission. In this case, it may be defaulted that the permission for performing the operations by the controlled device takes effect when the network status of the controlling device corresponding to the controlled device is a specified network status (for example, an online state or an offline state).

For example, if the controlled device is a mobile terminal such as a mobile phone or a tablet, permission for a network access operation that is set for the controlled device is a website such as www.huawei.com that the mobile terminal is allowed to access. It is defaulted that when the network status of the controlling device associated with the mobile terminal is an offline state, the mobile terminal can access the website that is set in the permission; but when the network status of the controlling device associated with the mobile terminal is an online state, website access permission of the mobile terminal is not limited and all websites can be accessed.

It should be understood that the permission for the operation corresponding to the controlled device usually may be presented in a form of a list, an array, a structure, a key-value pair, a linked list, or another data structure. This is not limited in this embodiment of the present invention.

For example, assuming that the controlled device is a network camera, permission correspondingly set for the controlled device may be indicated in a form of a key-value pair key: value as follows: {"unique device identifier", "on/off"}. On indicates turning on a network camera and off indicates turning off the network camera, that is, on indicates enabling a shooting function of the network camera and off indicates stopping/disabling the shooting function of the network camera.

For example, the controlled device is a smart door lock in a smart household environment, and correspondingly has permission for door lock enabling and disabling functions. Similarly, the permission that is set for the smart door lock may be represented in a form of a key-value pair as follows: {"unique device identifier", "on/off"}. Herein, on indicates locking the door lock and off indicates unlocking the door lock.

For example, the controlled device is a mobile terminal such as a mobile phone or a tablet, and network access permission that is set for the mobile terminal may be indicated by a legal website access list or an illegal website access list. Network access permission may also be indicated in a form of a key-value pair as follows: {"unique device identifier", "www.huawei.com|www.baidu.com| . . . "}. When the first website list indicates a website that the mobile terminal is allowed to access, the first website list may also be referred to as a website whitelist. When the first website list indicates a website that the mobile terminal is forbidden to access, the first website list may also be referred to as a website blacklist. For example, the first website list indicates a website allowed to be accessed, and indicates that the mobile terminal can normally access a website such as Huawei or Baidu in the first website list. Another website not in the first website list is not allowed to be accessed, and there is no access permission.

For example, the controlled device is a mobile terminal such as a mobile phone and a tablet. Application program control permission that is set for the controlled device may include an application program that is allowed or forbidden to be controlled, or may include a time during which the application program is allowed or forbidden to be used, a range within which some functions of the application program are adjusted, and the like, and is usually indicated by a first application program list. Herein, detailed descriptions are provided in the following embodiments. The application program control permission may also be indicated in a form of a key-value pair as follows: {"unique device identifier", "com.huawei.wallet|QQ|WeChat| . . . "}. When the first application program list indicates an application program that the mobile terminal is allowed to control, the first application program list may also be referred to as an application program whitelist. When the first application program list indicates an application program that the mobile terminal is forbidden to control, the first application program list may also be referred to as an application program blacklist. For example, when the first application program list is an application program whitelist indicating that using by the mobile terminal is allowed, it indicates that the mobile terminal can normally use an application program such as Huawei wallet, QQ, or WeChat in the first application program list. Another application program not in the first application program list cannot be used, and there is no using permission.

It should be understood that "on/off" in the foregoing embodiment is an identifier used to identify whether the controlled device has permission for performing a functional operation, is a representation form of an identifier, and may be represented by a preset value such as another self-defined value (for example, "0/1") or a character string (for example, "0X0010/0X0001"). This is not limited in this embodiment of the present invention.

It should be understood that the user may further perform a corresponding operation on such as increase, modify, or delete the information such as the controlling device, the controlled device, and permission for performing a related operation by the controlled device in the database.

Figure 5:
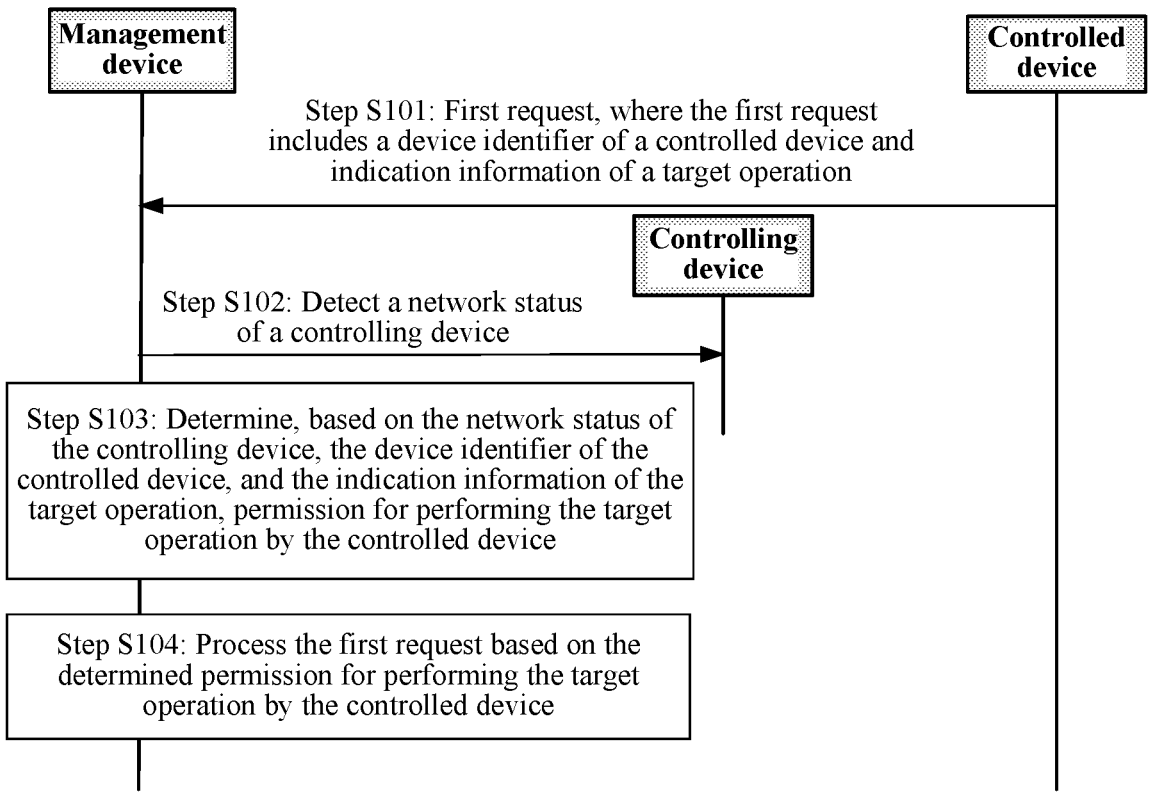
FIG. 5 is a schematic flowchart of a permission management method according to an embodiment of the present invention.
Figure 6:
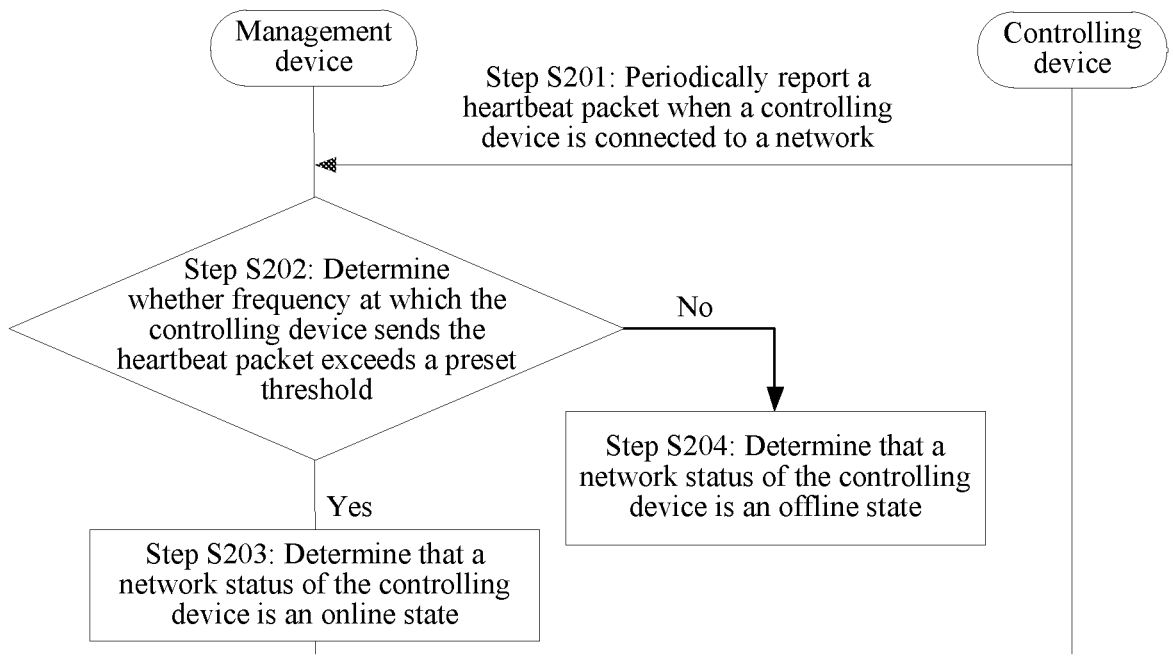
FIG. 6 to FIG. 8 are schematic flowcharts of several methods for detecting a status of a controlling device according to embodiments of the present invention.
Figure 7:
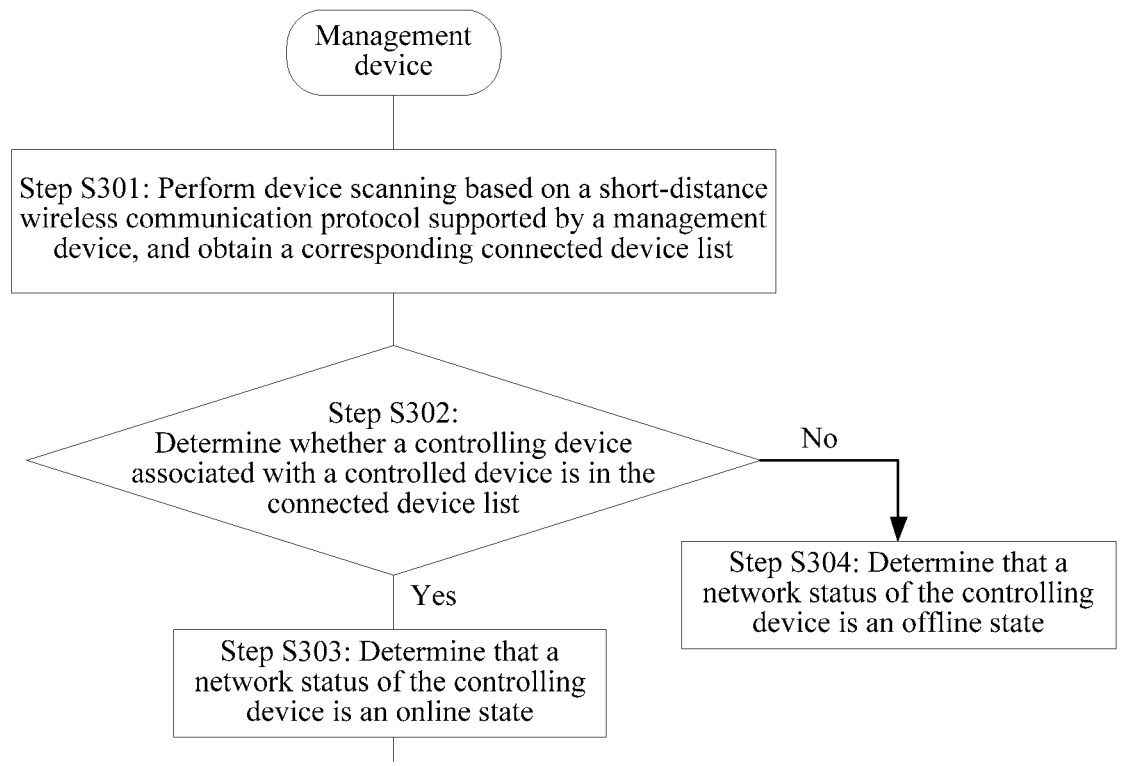
Figure 8:
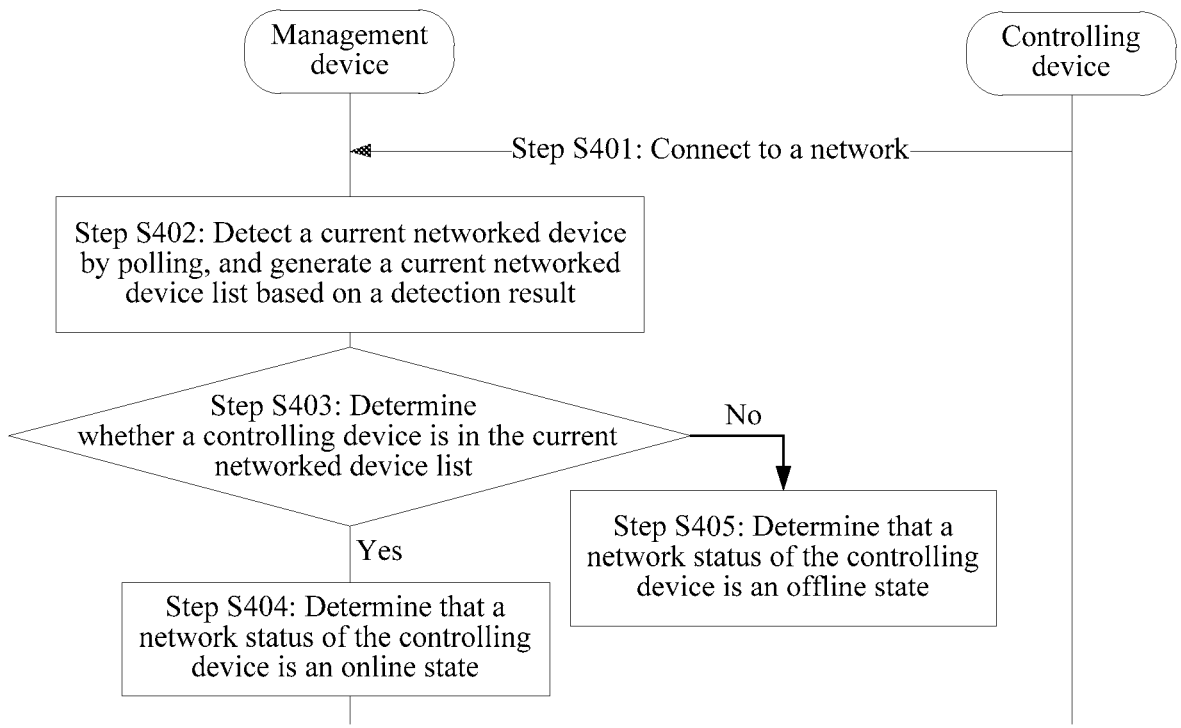

Based on the descriptions of related content in the embodiments shown in FIG. 1 to FIG. 3 and FIG. 4A to FIG. 4F, the following describes a permission management method provided in an embodiment of the present invention. FIG. 5 is a schematic flowchart of a permission management method according to an embodiment of the present invention. The method includes the following steps.

Step S101: A controlled device sends a first request to a management device, where the first request includes a device identifier of the controlled device and indication information of a target operation. Correspondingly, the management device receives the first request sent by the controlled device.

In some embodiments, the target operation may be an operation requested by the controlled device. For example, for a controlled device such as a network camera, the target operation may be enabling a shooting function of the network camera. The example is only used for description and constitutes no limitation.

The indication information of the target operation is used to indicate an operation requested by the controlled device. In some embodiments, the indication information of the target operation may be description information of the target operation, may be a binary code representing the target operation, or may be other information used to indicate the operation requested by the controlled device. This is not limited herein.

Step S102: The management device detects a network status of a controlling device associated with the controlled device.

In this application, permission for the target operation may be related to the network status of the controlling device. When the controlling device is in different network statuses, the permission for performing the target operation by the controlled device is different. For example, when the controlling device is online, an operation of opening a smart curtain (the controlled device) is allowed to be performed on the smart curtain. When the controlling device is offline, an operation of opening a smart curtain (the controlled device) is not allowed to be performed on the smart curtain.

Step S103: The management device determines, based on the network status of the controlling device, the device identifier of the controlled device, and the indication information of the target operation, permission for performing the target operation by the controlled device.

In this application, the permission may indicate whether the controlled device has permission for performing the operation, or indicate duration, a range, or a degree for performing the operation by the controlled device or other information about some factors and the like used to affect execution of the operation. As can be learned from related descriptions in the foregoing embodiments, the permission may be specifically represented in a plurality of forms, for example, permission for starting a washing machine may be indicated by a definite identifier bit, for example, 1-bit on/off. For example, accessing a website or accessing an application program app may be indicated by a legal list or an illegal list. For example, permission for adjusting a temperature of a smart air conditioner may be indicated by adjustment of a temperature range, permission for watching a television may be indicated by watchable duration, and permission for adjusting a volume of a sound box may be indicated by an adjustable volume range. This is more applicable to abundant smart household applications in the future.

In this application, the permission for performing the target operation by the controlled device is related to the network status of the controlling device, the device identifier of the controlled device, and the indication information of the target operation.

In some embodiments, a database may be maintained on a management device side. The database includes: permission for performing respective operations by one or more controlled devices. Specifically, permission for performing an operation by a controlled device is related to the network status of the controlling device. When the controlling device is in different network statuses, permission for performing a specific operation by the controlled device is different. Table 1 shows an example of the database.

TABLE 1

| | Permission for performing an operation by a controlled device | | |
|---|---|---|---|
| Controlled device | Permission when a controlling device is online | Permission when a controlling device is offline | Operation |
| Mobile phone | Allowed to access all websites | Allowed to access the Huawei website | Access a website |
| | Adjustable volume range from 0% to 100% | Adjustable volume range from 45% to 55% | Adjust a volume |
| | Allowed to start all application programs | Allowed to start a non-entertainment application program | Start an application program |
| Curtain | Allowed to open 0% to 100% | Allowed to open 0% to 10% | Open a curtain |
| | Allowed | Forbidden | Close a curtain |
| ... | ... | ... | ... |

In some embodiments, the management device may determine, in the database and based on a parameter carried in the first request (for example, the network status of the controlling device, the device identifier of the controlled device, and the indication information of the target operation) and the network status of the controlling device, the permission for performing the target operation by the controlled device.

In some embodiments, the management device may determine, based on the device identifier of the controlled device and the network status of the controlling device, permission for various operations corresponding to the controlled device when the controlling device is in the network status. Then, the management device determines, in the permission for the various operations corresponding to the controlled device and based on the indication information of the target operation, the permission for performing the target operation by the controlled device. A specific implementation may be described in detail in the following embodiments.

The database shown in Table 1 is used as an example. Permission for performing various operations by the curtain may be determined based on a device identifier of the curtain (for example, a device name) and the network status of the controlling device (for example, the controlling device is online). As shown in Table 1, it may be determined that permission for performing an operation of opening the curtain by the curtain is allowed to open by 0% to 100%, and permission for performing an operation of closing the curtain by the curtain is allowed to close. When an operation (that is, the target operation) requested by the curtain is opening the curtain, it may be determined, in the determined permission for performing various operations by the curtain, that permission for opening the curtain by the curtain is allowing the curtain to be opened by 0% to 100%.

It should be noted that Table 1 and the example are only for description purpose and constitute no limitation. Herein, the database may further be the database shown in FIG. 4A to FIG. 4F, that is, may further include configuration information respectively corresponding to the controlled device and the controlling device. For specifics, refer to FIG. 4A to FIG. 4F and details are not described herein.

It should be noted that different types of controlled devices usually can perform different operations. For example, the curtain can perform the operation of opening the curtain, and a bulb can perform an operation of lighting. A plurality of controlled devices of a same type can perform a same operation, for example, a plurality of bulbs can perform the same operation of lighting.

Step S104: The management device processes the first request based on the determined permission for performing the target operation by the controlled device.

In an implementation, the management device may notify, by using a radio frequency module, the controlled device of the permission for performing the target operation by the controlled device. Correspondingly, the management device receives the permission for performing the target operation by the controlled device, and may further perform the target operation based on the permission for the target operation.

Specifically, if the received permission is that the controlled device is allowed to perform the target operation, the controlled device performs the target operation. If the received permission is that the controlled device is not allowed to perform the target operation, the controlled device does not perform the target operation. For example, the controlled device is the curtain. If determined permission for the operation (that is, the target operation) of closing the curtain is allowed to close, after receiving the permission for allowing to close the curtain, the controlled device may perform the operation of closing the curtain.

In another implementation, the management device sends a control instruction to the controlled device based on the determined permission for performing the target operation by the controlled device. Correspondingly, the controlled device receives the control instruction and executes the control instruction. For example, the controlled device is a bulb, and the target operation requested by the controlled device is starting lighting. If the bulb is allowed to perform an operation of starting lighting, the control instruction may be an instruction for starting lighting. Correspondingly, the controlled device executes the instruction for starting lighting and enables a lighting function of the bulb; otherwise, the controlled device performs no processing.

The following describes several implementations of detecting the network status of the controlling device by the management device in this application in detail.

In a first implementation, the management device determines the network status of the controlling device based on an interval at which the controlling device sends a heartbeat packet. Specifically, referring to FIG. 6, the following steps are included:

Step S201: The controlling device associated with the controlled device periodically reports a heartbeat packet to the management device.

Step S202: The management device determines whether frequency at which the controlling device sends the heartbeat packet exceeds a preset threshold.

Step S203: Determine that the network status of the controlling device associated with the controlled device is an online state.

Step S204: Determine that the network status of the controlling device associated with the controlled device is an offline state.

In some embodiments, a radio frequency module (which may be specifically a transmitter) of the controlling device may periodically (for example, at an interval of 2 minutes) send a heartbeat packet to the management device, to report a current network status of the controlling device. Correspondingly, a radio frequency module (which may be specifically a receiver) of the management device may receive the heartbeat packet sent by the controlling device.

Further, a processor of the management device may determine the network status of the controlling device based on frequency/an interval at which the received heartbeat packet is sent by the controlling device. Specifically, when determining that the frequency/the interval at which the controlling device sends the heartbeat packet exceeds a preset threshold (for example, two minutes, or a heartbeat packet is sent at an interval of two minutes), the processor of the management device may determine that the network status of the controlling device is an online state; otherwise, determine that the network status of the controlling device is an offline state.

During implementation of this embodiment of the present invention, the current network status of the controlling device can be detected by using the frequency at which the controlling device sends the heartbeat packet, to prepare for subsequent determining of permission for performing some functional operations by the controlled device when the controlling device is in the network status.

In a second implementation, the management device determines whether the controlling device is in a connected device list, to determine the network status of the controlling device. Specifically, referring to FIG. 7, the following steps are included:

Step S301: When the management device supports a short-distance wireless communication protocol, perform device scanning based on the short-distance wireless communication protocol, and generate a connected device list based on a device obtained by scanning.

Step S302: The management device determines whether the controlling device associated with the controlled device is in the connected device list.

Step S303: Determine that the network status of the controlling device associated with the controlled device is an online state.

Step S304: Determine that the network status of the controlling device associated with the controlled device is an offline state.

In some embodiments, when the controlling device supports the short-distance wireless communication protocol, a radio frequency module 216 of the management device may perform device scanning and detection in real time or periodically within a preset distance range (for example, a circle formed by using the management device as a center and 10 meters as a radius) supported by the short-distance wireless communication protocol. Further, the processor of the management device may generate, based on a device scanning result, a corresponding short-distance wireless communication device list that may also be referred to as the connected device list. The connected device list includes one or more devices, for example, the controlling device and the controlled device, that support establishment of short-distance wireless communication with the management device. Further, the processor of the management device may further determine whether the controlling device is in the short-distance wireless communication device list, and if yes, the processor may determine that the network status of the controlling device is an online state; otherwise, determine that the network status of the controlling device is an offline state.

Figure 9:
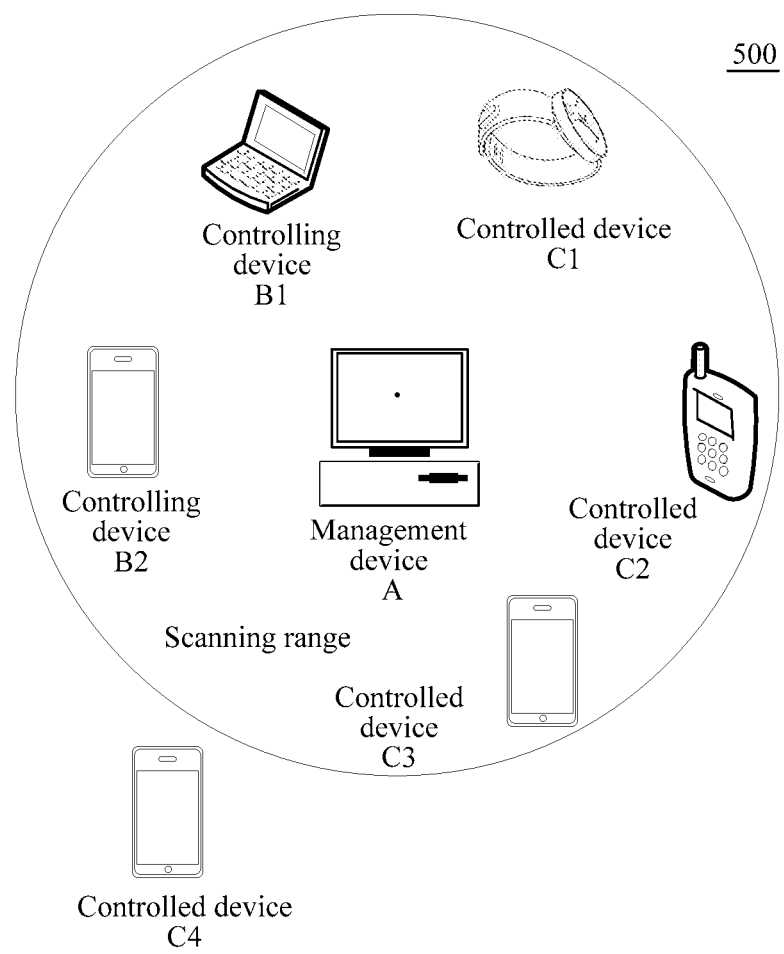
FIG. 9 is a schematic diagram of a device scanning scenario according to an embodiment of the present invention.

For example, FIG. 9 is a schematic diagram of a device scanning scenario according to an embodiment of the present invention. The schematic diagram 500 of the scenario includes a management device A, controlling devices B1 and B2, and controlled devices C1, C2, C3, and C4. All the devices shown in the figure support a Wi-Fi wireless communication connection. The management device may periodically (for example, at an interval of five minutes) perform device scanning and detection of short-distance wireless communication. Herein, it is assumed that device detection and scanning are performed within a circle formed by using the management device as a center and 20 meters as a radius. As can be learned from the figure, devices detected by the management device include the five devices B1, B2, C1, C2, and C3. The management device may generate a corresponding Wi-Fi communications device list based on the five devices obtained by scanning, and the Wi-Fi communications device list includes the five devices B1, B2, C1, C2, and C3. The following Table 2 shows an example of the Wi-Fi communications device list.

TABLE 2

| Connected device | Device identifier |
| --- | --- |
| Controlling device B1 | B1 |
| Controlling device B2 | B2 |
| Controlled device C1 | C1 |
| Controlled device C2 | C2 |
| Controlled device C3 | C3 |

It should be understood that the short-distance wireless communication protocol may include a short-distance wireless communication protocol such as Wi-Fi (Wireless Fidelity, Chinese: wireless fidelity), Bluetooth (Bluetooth), ZigBee, and NFC (Near Field Communication, Chinese: short-distance wireless communication).

During implementation of this embodiment of the present invention, whether the controlling device is in the current connected device list can be automatically detected by scanning by using the short-distance wireless communication protocol, to determine the current network status of the controlling device, and prepare for subsequent determining of permission for performing some functional operations by the controlled device when the controlling device is in the network status.

In a third implementation, the management device determines whether the controlling device is in a networked device list, to determine the network status of the controlling device. Specifically, referring to FIG. 8, the following steps are included:

Step S401: Connect the controlling device associated with the controlled device to a network by using the management device.

Step S402: The management device detects a current networked device, and generates a current networked device list based on a detection result.

Step S403: The management device polls to determine whether the controlling device associated with the controlled device is in the current networked device list.

Step S404: Determine that the network status of the controlling device associated with the controlled device is an online state.

Step S405: Determine that the network status of the controlling device associated with the controlled device is an offline state.

In some embodiments, another device (for example, the controlling device or the controlled device) may be connected to a network by using the management device. In this case, the management device automatically records the another device currently networked. Therefore, the management device may learn of the network status of the controlling device by using the another device. In some embodiments, the management device may directly detect the network status of the controlling device.

In some embodiments, the management device may be a device with a network connection detection function such as a router, a gateway, a switch, or a modem. In this case, the management device may learn of the network status of the controlling device by using the another device, or directly detect the network status of the controlling device.

Specifically, the radio frequency module of the management device may detect a current networked device at a specified interval (for example, 10 minutes) by using a polling mechanism. Then, the processor of the management device may generate the current networked device list based on a detection result. Further, the processor may determine whether the controlling device is in the current networked device list, and if yes, the processor may determine that the network status of the controlling device is an online state; otherwise, determine that the network status of the controlling device is an offline state.

During implementation of this embodiment of the present invention, the current network status of the controlling device can be effectively detected, to prepare for subsequent determining of permission for performing some functional operations by the controlled device when the controlling device is in the network status.

During implementation of the embodiments of the present invention, operation permission of the controlled device can be smartly managed, and some unpredictable consequences caused by a misoperation or an operation with inappropriate permission performed by a user on the controlled device can be avoided. For example, a child is prevented from accessing some inappropriate network information by connecting a network using the controlled device without adult control, thereby improving network use security of a device.

For ease of understanding a permission management method provided in this application, the following describes specific implementations of this application in three application scenarios in detail.

In a first application scenario, the operation (that is, the target operation) requested by the controlled device is a control operation of a device function. Herein, the device function may be a function of the controlled device, for example, a bulb has a lighting function and an air conditioner has a cooling operation. The control operation of the device function corresponding to the bulb may be enabling the lighting function.

Figure 10:
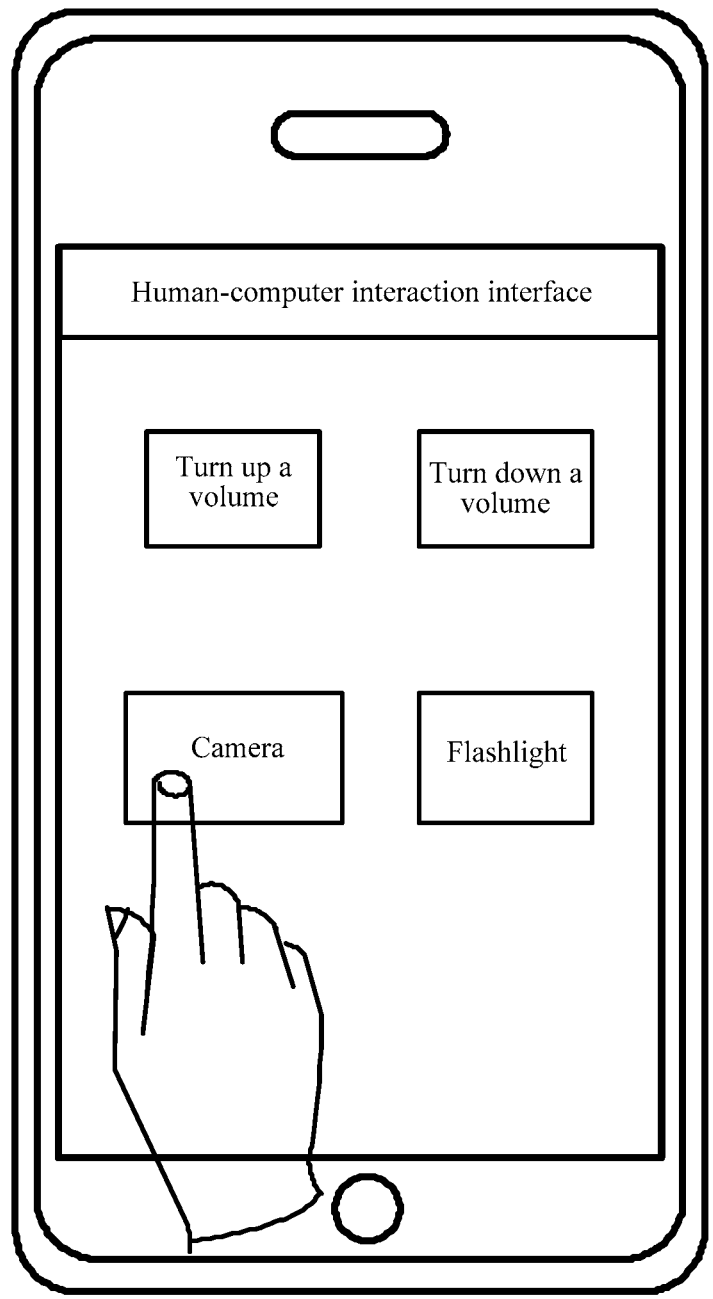
FIG. 10 is a schematic diagram of a human-computer interaction interface of a device function control operation according to an embodiment of the present invention.

As shown in FIG. 10, a mobile phone is used as an example. A screen of the mobile phone may display a human-computer interaction interface, and the human-computer interaction interface may provide a control for using a device function to the user. Human-computer interaction interfaces of different controlled devices may display different control keys. For example, the controlled device is a network camera. A functional key correspondingly displayed on a human-computer interaction interface by the network camera may be a camera enabling key, a camera disabling key, and the like. If the controlled device is a smart refrigerator, a functional key displayed on a human-computer interaction interface may be a temperature adjustment key, a light adjustment key, and the like.

Specifically, when the user intends to perform a control operation on a functional control of the controlled device, as shown in FIG. 10, a camera function selected by a user is used as an example, and the user taps a camera control to enable a shooting function of a camera. When the controlled device detects a control operation of a user, the processor may generate a corresponding first request, where the first request may include the indication information of the target operation performed by the user on the controlled device and the device identifier of the controlled device. As shown in FIG. 10, the first request generated by the processor of the mobile phone may carry a device identifier of the mobile phone and description information about enabling a shooting function of the camera, and the like.

Figure 11:
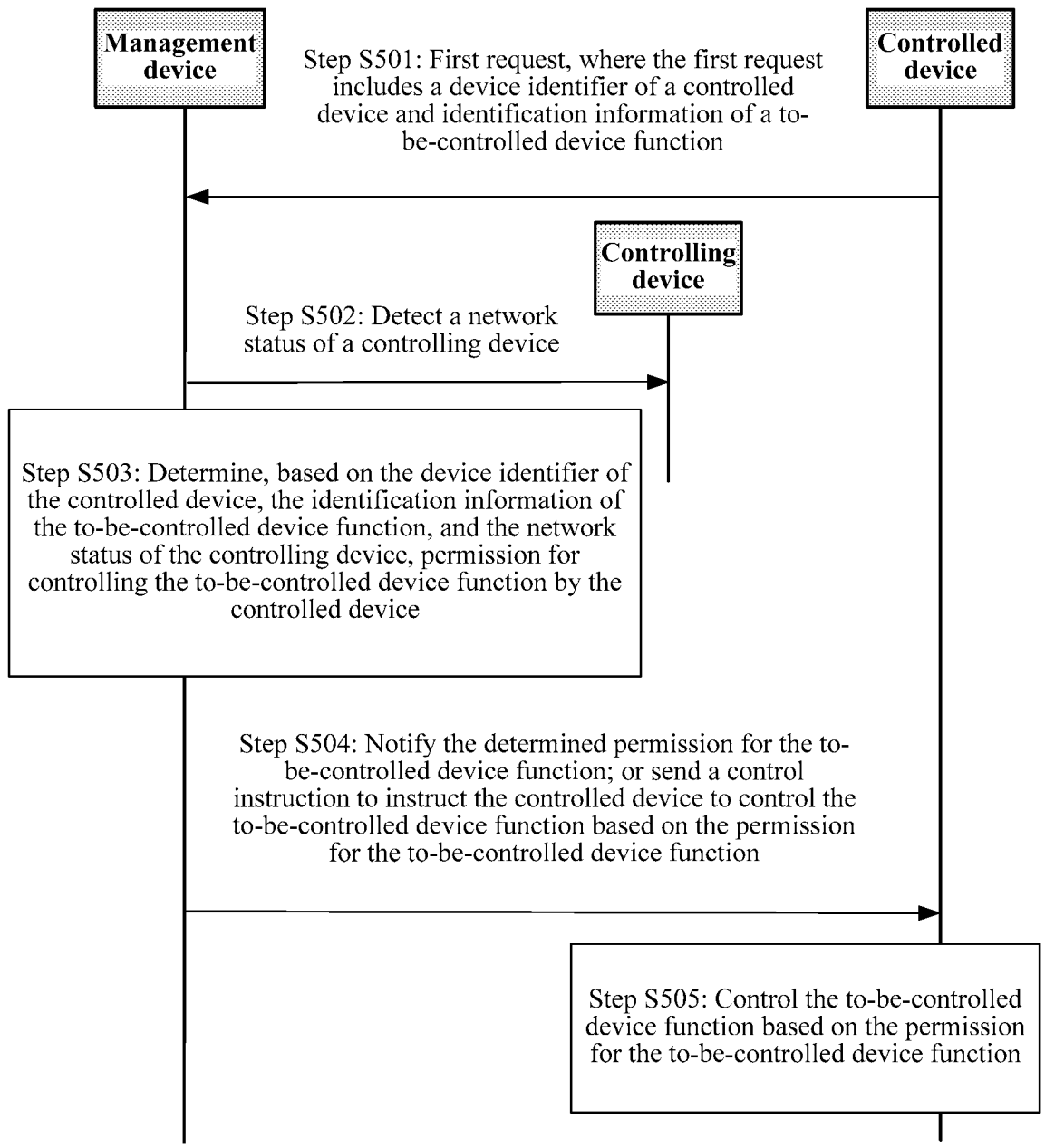
FIG. 11 is a schematic flowchart of a permission management method corresponding to an application scenario based on the device function control operation according to an embodiment of the present invention.

FIG. 11 shows a specific implementation of the permission management method provided in this application in a first application scenario, and details may be as follows:

Step S501: A controlled device sends a first request to a management device, where the first request includes a device identifier of the controlled device and indication information of a target operation. The indication information of the target operation herein is identification information of a to-be-controlled device function. Correspondingly, the management device receives the first request sent by the controlled device.

In some embodiments, the identification information of the to-be-controlled device function may be description information of the device function, may be an ID of the device function, or may be other information used to indicate the to-be-controlled device function that the controlled device requests to control. This is not limited herein.

For example, a lighting function of a bulb is the to-be-controlled device function, and the identification information of the to-be-controlled device function may be a character string "starting lighting on", or may be an ID "0X" representing the lighting function of the bulb, or the like.

Step S502: The management device detects a network status of a controlling device associated with the controlled device. For specifics, refer to related steps in the embodiment in FIG. 5, and details are not described herein.

Step S503: The management device determines, based on the network status of the controlling device, the device identifier of the controlled device, and the indication information of the target operation, permission for performing the target operation by the controlled device. Herein, specifically, the management device may determine, based on the network status of the controlling device, the device identifier of the controlled device, and the identification information of the to-be-controlled device function, that the permission for performing the target operation by the controlled device may be permission for controlling the to-be-controlled device function by the controlled device.

In some embodiments, a specific implementation of step S503 may be: determining, by the management device based on the device identifier of the controlled device and the network status of the controlling device, permission for various operations corresponding to the controlled device when the controlling device is in the network status; and determining, by the management device in permission for various operations corresponding to the controlled device and based on the identification information of the to-be-controlled device function, permission for controlling the to-be-controlled device function by the controlled device when the controlling device is in the network status.

In some embodiments, the processor of the management device may determine, based on the device identifier of the controlled device, permission for various operations corresponding to the controlled device. The operation permission herein may be permission for various operations corresponding to the controlled device when the controlling device associated with the controlled device is in various network statuses (for example, an online state and an offline state). Next, the processor may determine, in the permission for the various operations of the controlled device and based on the identification information of the to-be-controlled device function and the determined network status of the controlling device (for example, an offline state), corresponding permission for controlling the to-be-controlled device function by the controlled device.

For example, if the controlled device is a smart washing machine, the following Table 3 shows permission for various operations supported by a smart refrigerator.

TABLE 3

| Controlled device | Permission for performing an operation by a controlled device | | |
|---|---|---|---|
| | Permission when a controlling device is online | Permission when a controlling device is offline | Operation |
| Smart washing machine | On | Off | Enable a drying function |
| | Allow adjustment of a high level, an intermediate level, and a low level | Allow adjustment of a low level | Adjust a water level |
| | Adjustment of any duration | Not exceed 20 minutes | Adjust a time |

It is assumed that a user intends to adjust a water level function of the washing machine to the intermediate level to facilitate washing. Referring to descriptions of related content in the foregoing embodiments, the first request carries a washing machine identifier and an intermediate water level adjustment identifier. In a smart household system, after receiving the first request, the management device (which usually may be a computer) may perform message parsing to learn that the device identifier of the controlled device is the washing machine identifier and the identification information of the to-be-controlled device function is the intermediate water level adjustment identifier. The management device may find, from the preset database based on the washing machine identifier, permission for various functional operations correspondingly supported by the washing machine, as shown in the foregoing Table 3. Further, the management device may determine, in the permission for the various operations shown in Table 3 and based on the detected network status of the controlling device that is assumed as an online state herein and with reference to the intermediate water level adjustment identifier, that the washing machine has permission for adjusting a water level to the intermediate level when the controlling device is in the online state.

Step S504: The management device processes the first request based on the determined permission for performing the target operation by the controlled device. Herein, a specific implementation may be as follows: notifying, by the management device, the controlled device of the permission for controlling the to-be-controlled device function by the controlled device; or sending, by the management device, a control instruction to the controlled device based on the permission for controlling the to-be-controlled device function by the controlled device.

Correspondingly, after the management device processes the first request, the method may include step S505: The management device controls the to-be-controlled device function based on the permission for the to-be-controlled device function.

In a first implementation, the management device notifies the controlled device of the permission for controlling the to-be-controlled device function by the controlled device. Correspondingly, the controlled device receives the permission for the to-be-controlled device function, and controls the to-be-controlled device function based on the permission.

Specifically, a radio frequency module of the management device may send a response message to the controlled device through a network, to notify the controlled device of the permission for controlling the to-be-controlled device function. Correspondingly, the radio frequency module of the controlled device may receive the response message sent by the management device, and perform message parsing to learn of the permission for controlling the to-be-controlled device function by the controlled device, so that the target operation is subsequently performed based on the permission.

For example, with reference to the foregoing example of the washing machine, the management device may notify the washing machine of a determined result that the washing machine has the permission for the functional operation of adjusting a water level to the intermediate level, and specifically delivers a 1-bit preset identifier "yes" to the washing machine.

After receiving the yes identifier, the washing machine may determine that the washing machine has the intermediate water level adjustment function, and then adjust a water level switch to the intermediate level.

In a second implementation, the management device sends a control instruction to the controlled device based on the permission for controlling the to-be-controlled device function by the controlled device. Correspondingly, the controlled device receives the control instruction and executes the control instruction.

Specifically, after determining the permission for controlling the to-be-controlled device function by the controlled device, the processor of the management device may send a corresponding control instruction to the controlled device by using the radio frequency module. Correspondingly, the radio frequency module of the controlled device may receive the control instruction sent by the management device, and then, the processor of the controlled device may control the to-be-controlled device function in response to the control instruction and based on the permission for the to-be-controlled device function.

For example, if the controlled device is a curtain, it is assumed that an existing user intends to open the curtain, and the network status of the controlling device corresponding to the curtain is an offline state. Permission for opening the curtain that is set for the curtain when the controlling device is in different network statuses is shown in the following Table 4.

TABLE 4

| Controlled device | Permission for performing an operation by a controlled device | | |
|---|---|---|---|
| | Permission when a controlling device is online | Permission when a controlling device is offline | Operation |
| Curtain | Allowed to open 0% to 100% | Allowed to open 0% to 20% | Open a curtain |

As can be learned from the foregoing Table 4, permission for opening the curtain is also different when the controlling device is in different network statuses. When the controlling device is in an online state, the permission for opening the curtain may be random adjustment from a maximum opening degree (completely 100% opening) to closing (0%).

However, when the controlling device is in an offline state, the permission for opening the curtain may be adjustment within a range of 0% to 20%, to avoid that when the user corresponding to the controlling device is not at home, stealing easily occurs when a window is completely opened, or rain easily enters in a thunderstorm when a window is opened excessively widely, or the like.

Referring to descriptions of the foregoing related steps, when the management device receives the first request (which may also be a curtain opening request herein), and the first request includes a curtain identifier and identification information about opening the curtain, it may be determined from Table 4 that opening the curtain is supported within the range of 0% to 20%. Next, the management device may generate a corresponding control instruction, and send the control instruction to the curtain used as the controlled device, where the control instruction is used to instruct the curtain to be opened to a degree of 10%. Correspondingly, after the curtain receives the control instruction sent by the management device, the curtain is opened to the degree of 10% based on the control instruction. For example, a length of the curtain is 1 m and the curtain is controlled to open to a location of 0.1 m.

In some embodiments, the management device may further determine, with reference to a control time of the to-be-controlled device function, the permission for controlling the to-be-controlled device function by the controlled device.

For example, assuming that the controlled device is a network camera and a network status of the controlling device is an offline state, correspondingly determined operation permission for the network camera is shown in the following Table 5, and Table 5 shows enabling and disabling of a shooting function of the network camera in various periods.

TABLE 5

| Operation period (available period) | Permission for performing an operation by a controlled device |
| --- | --- |
| 07:30-18:30 | On (enabling a shooting function) |
| 18:30-07:30 | Off (disabling a shooting function) |

It is assumed that a user operates the network camera (taps a start button) at 8:30 AM, and intends to start the network camera to perform shooting monitoring. After detecting the start operation of the user, the network camera automatically generates a corresponding shooting function enabling request, and sends the shooting function enabling request to a corresponding management device (for example, a palmtop computer). The shooting function enabling request includes a shooting function enabling time 8:30. As can be learned from the operation permission for the network camera shown in Table 5, 8:30 is in the operation period from 07:30 to 18:30, and a corresponding operation permission identifier bit is "On" and indicates enabling the shooting function. In this way, the management device may determine that the network camera currently has a function of enabling the shooting function of the network camera. Further, the management device may send a shooting function enabling instruction to the network camera by using a radio frequency module. Correspondingly, the network camera receives the shooting function enabling instruction sent by the management device, and enables the shooting function of the network camera.

In a second application scenario, the operation (that is, the target operation) requested by the controlled device is a control operation of an application program. For example, an application program is started or stopped, or an application program is used to perform access such as adjust a volume of a sound box.

Figure 12:
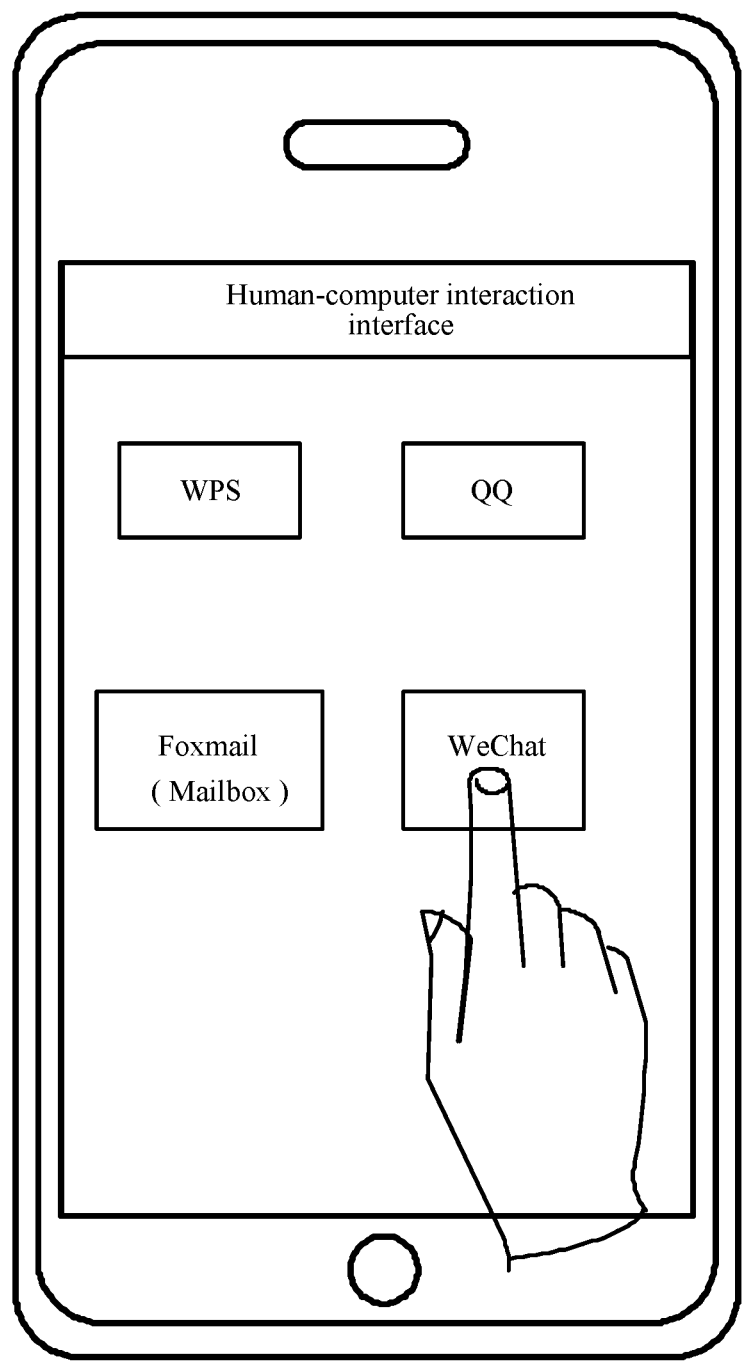
FIG. 12 is a schematic diagram of a human-computer interaction interface of an application program control operation according to an embodiment of the present invention.

As shown in FIG. 12, a mobile phone is used as an example, and a screen of the mobile phone displays a human-computer interaction interface. The human-computer interaction interface may include some or all application programs apps such as WeChat, QQ, a browser, and a volume adjustment app installed on the controlled device. Specifically, when a user intends to perform an adjustment/control operation on some application programs apps installed on the controlled device. For example, as shown in FIG. 12, the application program app WeChat selected by the user is used as an example, and the user taps the app WeChat to start and use the app WeChat. When the controlled device detects the foregoing operation of the user, the processor may generate a corresponding first request, where the first request may include the indication information of the target operation performed by the user on the controlled device and the device identifier of the controlled device. As shown in FIG. 10, the first request generated by the processor of the mobile phone may carry a device identifier of the mobile phone and description information about starting the app WeChat, and the like.

Figure 13:
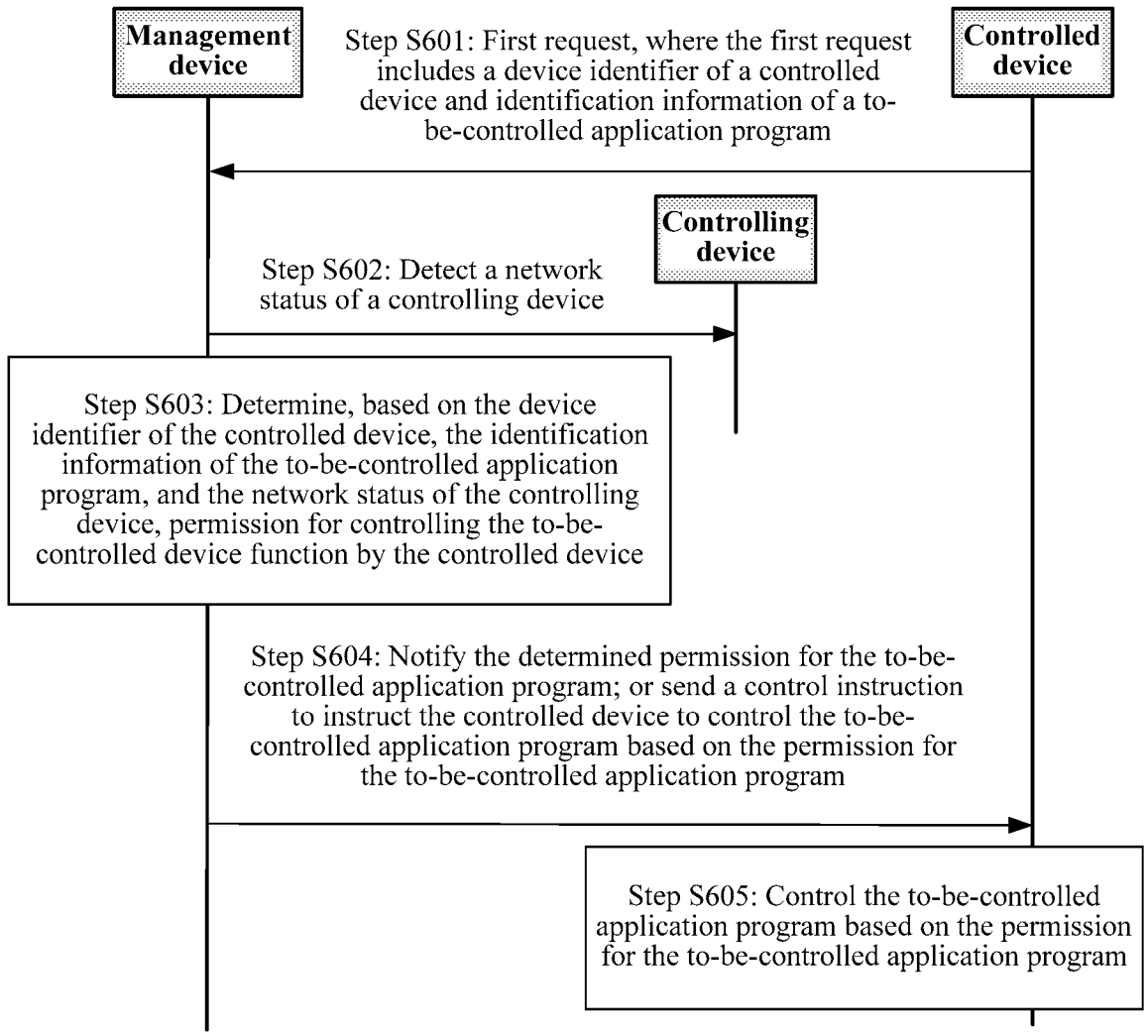
FIG. 13 is a schematic flowchart of a permission management method corresponding to an application scenario based on the application program control operation according to an embodiment of the present invention.

FIG. 13 shows a specific implementation of the permission management method provided in this application in a second application scenario, and details may be as follows:

Step S601: A controlled device sends a first request to a management device, where the first request includes a device identifier of the controlled device and indication information of a target operation. The indication information of the target operation herein is identification information of a to-be-controlled application program. Correspondingly, the management device receives the first request sent by the controlled device.

Specifically, referring to descriptions of related content in the foregoing embodiments, the radio frequency module of the controlled device may send the first request to the management device. The first request carries the identification information of the to-be-controlled application program and a device identifier of the controlled device, so that the management device identifies a to-be-controlled application program of a controlled device whose permission is determined.

In some embodiments, the identification information of the to-be-controlled application program may be description information of the to-be-controlled application program, may be an identifier of the to-be-controlled application program, or may be other information used to indicate the to-be-controlled application program that the controlled device requests to control. This is not limited herein.

Step S602: The management device detects a network status of a controlling device associated with the controlled device. For specifics, refer to related steps in the embodiment in FIG. 5, and details are not described herein.

Step S603: The management device determines, based on the network status of the controlling device, the device identifier of the controlled device, and the indication information of the target operation, permission for performing the target operation by the controlled device. Herein, this step may be specifically: determining, by the management device based on the network status of the controlling device, the device identifier of the controlled device, and the identification information of the to-be-controlled application program, permission for controlling the to-be-controlled application program by the controlled device.

In some embodiments, a specific implementation of step S302 may be: determining, by the management device, a first application program list based on the device identifier of the controlled device and the network status of the controlling device; and determining, by the management device based on the first application program list and the identification information of the to-be-controlled application program, permission for controlling the to-be-controlled application program by the controlled device when the controlling device is in the network status.

In some embodiments, the first application program list is used to indicate an application program that the controlled device is allowed to control when the controlling device is in the network status, or an application program that the controlled device is forbidden to control when the controlling device is in the network status.

The first application program list herein may include permission for various application programs that the management device can control when the controlling device is in the network status, that is, one or more application programs that the controlled device is allowed or forbidden to control when the controlling device is in the network status.

In some embodiments, the determining, by the management device based on the first application program list and the identification information of the to-be-controlled application program, permission for controlling the to-be-controlled application program by the controlled device when the controlling device is in the network status has the following two specific implementations:

In an implementation, if the first application program list is used to indicate an application program that the controlled device is allowed to control when the controlling device is in the network status, when the to-be-controlled application program is in the first application program list, it is determined that the controlled device is allowed to control the to-be-controlled application program; otherwise, it is determined that the controlled device is forbidden to control the to-be-controlled application program.

In another implementation, if the first application program list is used to indicate an application program that the controlled device is forbidden to control, when the to-be-controlled application is not in the first application program list, it is determined that the controlled device is allowed to control the to-be-controlled application program; otherwise, it is determined that the controlled device is forbidden to control the to-be-controlled application program.

For example, if the controlled device is a mobile phone, permission for controlling an application program when the controlling device is in different network statuses is set for the mobile phone, as shown in the following Table 6.

TABLE 6

| Controlled device | Permission for performing an operation by a controlled device | |
|---|---|---|
| | Permission when a controlling device is online | Permission when a controlling device is offline |
| Mobile phone | Entertainment-type application program Navigation-type application program Social-type application | Navigation-type application program |

It is assumed that a child currently intends to use a game app installed on a mobile phone, a network status of a controlling device corresponding to the mobile phone is in an offline state, and a first request sent by the mobile phone to a management device (for example, a computer at home) includes an identifier of the mobile phone and an identifier of the game app. After receiving the first request, the management device may perform message parsing to learn of information such as the identifier of the mobile phone and the identifier of the game app. Further, the management device may determine a first application program list based on the identifier of the mobile phone and the network status of the controlling device. As can be learned from Table 6, the first application program list may include the navigation-type application program that is allowed to be used when the controlling device is in an offline state. Next, the management device may determine that the game app is not in the first application program list, to determine that the mobile phone used as the controlled device has no permission for using the game app.

Step S604: The management device processes the first request based on the determined permission for performing the target operation by the controlled device. Herein, a specific implementation may be as follows: notifying, by the management device, the controlled device of the permission for controlling the to-be-controlled application program by the controlled device; or sending, by the management device, a control instruction to the controlled device based on the permission for controlling the to-be-controlled application program by the controlled device.

Correspondingly, after the management device processes the first request, the method may include step S605: The controlled device controls the to-be-controlled device function based on the permission for the to-be-controlled application program.

In a first implementation, the management device notifies the controlled device of the permission for controlling the to-be-controlled application program by the controlled device. Correspondingly, the controlled device receives the permission for the to-be-controlled application program, and controls the to-be-controlled application program based on the permission.

Specifically, a radio frequency module of the management device may send a response message to the controlled device through a network, to notify the controlled device of the permission for controlling the to-be-controlled application program. Correspondingly, a radio frequency module of the controlled device may receive the response message sent by the management device, and perform message parsing to learn of the permission for controlling the to-be-controlled application program by the controlled device. If the controlled device has the permission for controlling the to-be-controlled application program, the processor may continue to control the to-be-controlled application program within a determined permission scope for the to-be-controlled application program.

In a second implementation, the management device sends a control instruction to the controlled device based on the permission for controlling the to-be-controlled application program by the controlled device. Correspondingly, the controlled device receives the control instruction and executes the control instruction.

Specifically, after determining the permission for controlling the to-be-controlled application program by the controlled device, the processor of the management device may send a corresponding control instruction to the controlled device by using the radio frequency module. Correspondingly, the radio frequency module of the controlled device receives the control instruction sent by the management device. Next, the processor of the controlled device may control the to-be-controlled application program in response to the control instruction and based on the permission for the to-be-controlled application program.

For example, it is assumed that a user currently intends to use a volume adjustment app 1 installed on a mobile phone used as the controlled device, to correspondingly adjust a volume. Permission for corresponding operations in different network statuses of the controlling device is set for the volume adjustment app, as shown in the following Table 7.

TABLE 7

| Controlled device | Permission for performing an operation by a controlled device | | Operation |
|---|---|---|---|
| | Permission when a controlling device is online | Permission when a controlling device is offline | |
| Mobile phone | Allowable volume adjustment range from 0% to 100% | Allowable volume adjustment range from 50% to 55% | Adjust a volume by using an app 1 |

As can be learned from the foregoing related steps, when detecting that a user adjusts a volume by using the app 1, the mobile phone used as the controlled device may send the first request to the management device (for example, a computer), where the first request includes/carries an identifier of the mobile phone and a volume adjustment identifier of the app 1. After receiving the first request, the management device may perform message parsing to learn of information such as the identifier of the mobile phone and the volume adjustment identifier of the app 1. Next, the management device may determine a first application program list based on the identifier of the mobile phone and a network status of a controlling device that is assumed as an offline state herein, where the first application program list includes permission for a to-be-controlled application that the controlled device can control when the controlling device is in the network status. As can be learned from Table 7, the first application program list may include that the allowable volume adjustment range of the app 1 is from 50% to 55%. Next, the management device may determine that the to-be-controlled application program app 1 is in the first application program list, and the allowable volume adjustment range of the app 1 is 50%-55% of a maximum volume that can be supported by the mobile phone. Next, the management device may send a control instruction to the mobile phone used as the controlled device, to control the mobile phone to adjust a volume to the range from 50% to 55%. Correspondingly, the mobile phone receives the control instruction sent by the management device, and adjusts, in response to the control instruction by using the app 1, the volume to the range from 50% to 55% of the maximum volume that can be supported by the device.

In some embodiments, the management device may further determine, with reference to a control time of the to-be-controlled application program, the permission for controlling the to-be-controlled application by the controlled device.

For example, it is assumed that the controlled device is a mobile terminal such as a mobile phone or a tablet, and the network status of the controlling device is an offline state. Operation permission information of the mobile terminal that is correspondingly determined is shown in the following Table 8. Table 8 shows applications that are allowed or forbidden to be used in various periods.

TABLE 8

| Operation period (available period) | Permission for performing an operation by a controlled device |
|---|---|
| 00:00-07:30 | Consumption-type application is forbidden |
| 07:30-12:00 | Video-audio entertainment-type and social-type applications are forbidden |
| 12:00-18:00 | Navigation-type and video-audio entertainment-type applications are forbidden |
| 18:00-24:00 | All applications can be used |

It is assumed that a user taps, at 15:02, to start a book reading application installed on the mobile terminal, for example, reading on the mobile phone. When detecting a start operation performed by the user on the book reading application, the mobile terminal may automatically generate a corresponding application start request and send the application start request to a management device (for example, a palmtop computer). The application start request includes an application start time (15:02), identification information of a to-be-started application (the book reading application), and a device identifier of the mobile terminal. As can be learned from the permission for various operations (that is, the application program list) corresponding to the mobile terminal shown in Table 8, 15:02 is within the operation permission period of 12:00 to 18:00, the operation permission corresponding to the operation permission period is that navigation-type and video-audio entertainment-type applications are forbidden, and the book reading application belongs to a book-type application and is not within the application use forbidding range. Therefore, the management device may determine that the mobile terminal currently has the permission for starting the book reading application on the mobile terminal. Further, the management device may send a book reading application start instruction to the mobile terminal. Correspondingly, the mobile terminal receives the book reading application start instruction sent by the management device, and starts, based on the instruction, the book reading application installed on the mobile terminal.

Figure 14:
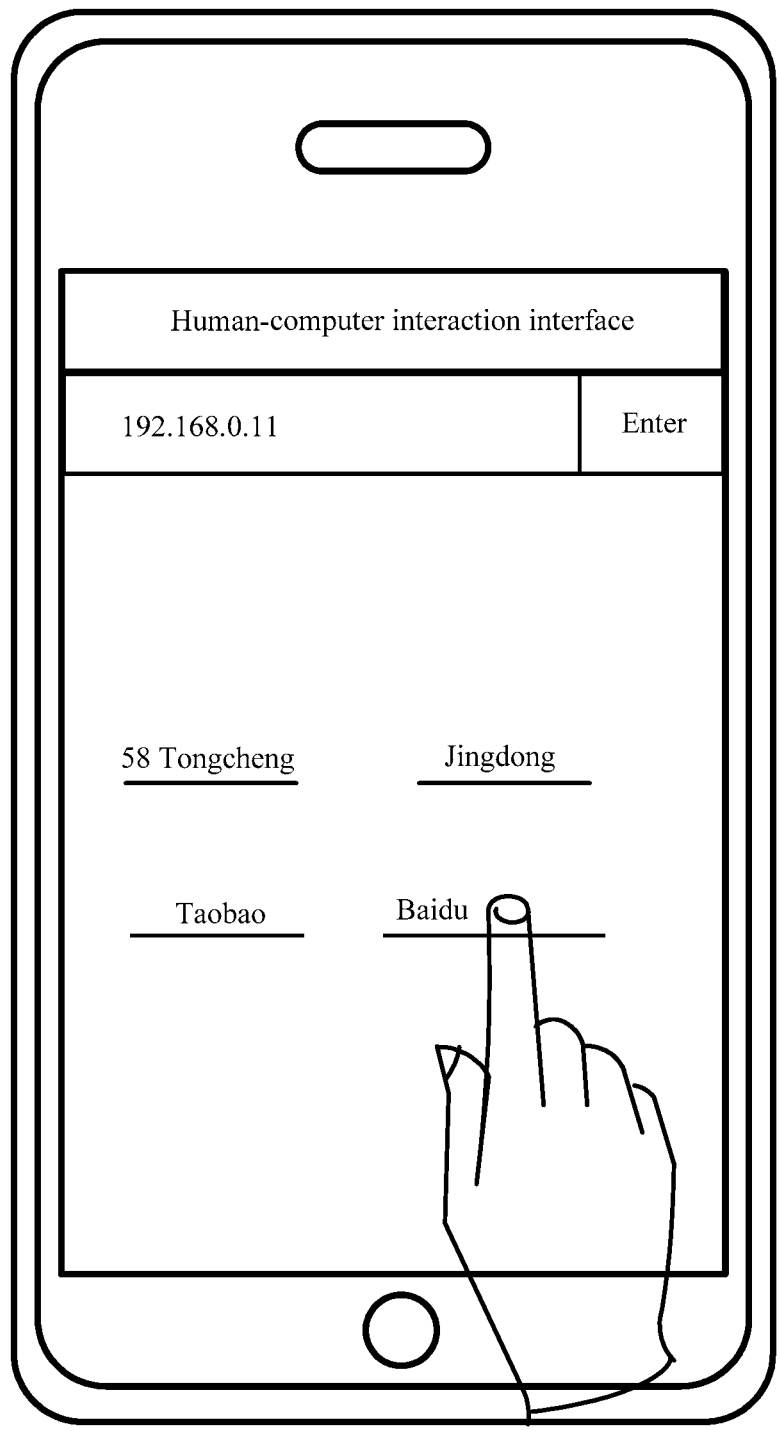
FIG. 14 is a schematic diagram of a human-computer interaction interface of a website access operation according to an embodiment of the present invention.

In a third application scenario, the operation (that is, the target operation) requested by the controlled device is a website access operation. For example, a Taobao website is accessed. As shown in FIG. 14, a mobile phone is used as an example. The screen of the mobile phone displays a human-computer interaction interface. The human-computer interaction interface may include some access websites or website links, for example, a Baidu link, a Sogou link, a Jingdong link, and a Taobao link, or include a website search box, allowing a user to enter a corresponding website in the website search box to search for and redirect to a corresponding website.

Specifically, when a user intends to access some websites by using the controlled device, the user may perform a related permitted operation on the controlled device. For example, as shown in FIG. 14, the Baidu website selected by a user is used as an example. The user taps a link to the Baidu website to access the corresponding Baidu website. When detecting the foregoing operation of the user, the controlled device may generate a corresponding first request by using a processor, where the first request may include the indication information of the target operation performed by the user on the controlled device and the device identifier of the controlled device. As shown in FIG. 14, the first request generated by the processor of the mobile phone may carry the device identifier of the mobile phone, description information (for example, an address of the Baidu website) about accessing the Baidu website, and the like.

Figure 15:
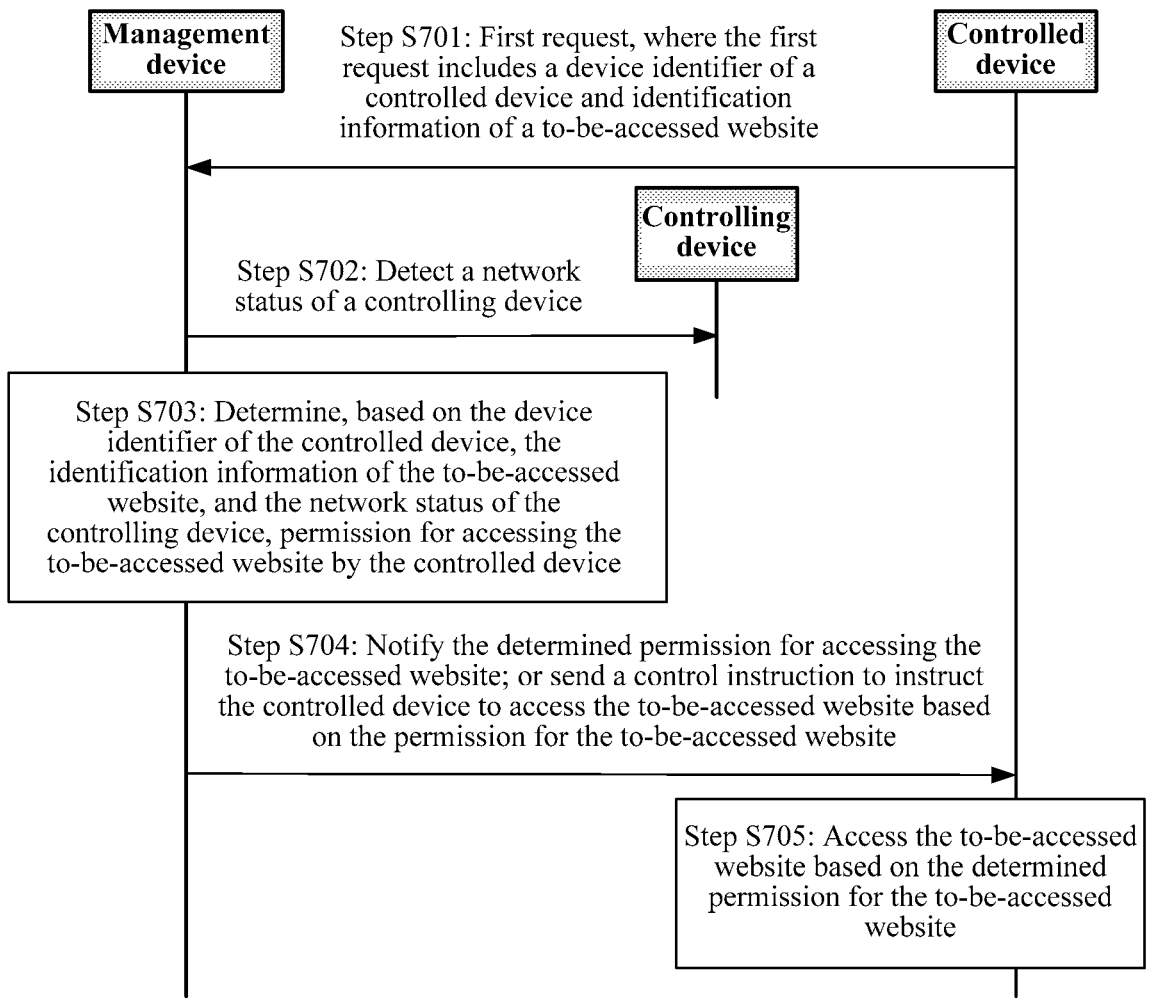
FIG. 15 is a schematic flowchart of a permission management method corresponding to an application scenario based on the website access operation according to an embodiment of the present invention.

FIG. 15 shows a specific implementation of the permission management method provided in this application in a third application scenario, and details may be as follows:

Step S701: A controlled device sends a first request to a management device, where the first request includes a device identifier of the controlled device and indication information of a target operation. The indication information of the target operation herein is identification information of a to-be-accessed website. Correspondingly, the management device receives the first request sent by the controlled device.

Specifically, referring to descriptions of related content in the foregoing embodiments, the radio frequency module of the controlled device may send the first request to the management device. The first request carries the identification information of the to-be-accessed website and the device identifier of the controlled device, so that the management device identifies the to-be-accessed website of the controlled device whose permission is determined.

In some embodiments, the identification information of the to-be-accessed website may be description information of the to-be-accessed website, may be identification information (for example, a website address or a website name) of the to-be-accessed website, or may be other information used to indicate the to-be-accessed website that the controlled device requests to access. This is not limited herein.

Step S702: The management device detects a network status of a controlling device associated with the controlled device. For specifics, refer to related steps in the embodiment in FIG. 5, and details are not described herein.

Step S703: The management device determines, based on the network status of the controlling device, the device identifier of the controlled device, and the indication information of the target operation, permission for performing the target operation by the controlled device. Herein, this step may be specifically: determining, by the management device based on the network status of the controlling device, the device identifier of the controlled device, and the identification information of the to-be-accessed website, permission for controlling the to-be-controlled application program by the controlled device.

In some embodiments, a specific implementation of step S703 may be: determining, by the management device, a first website list based on the device identifier of the controlled device and the network status of the controlling device; and determining, by the management device based on the identification information of the to-be-accessed website and the first application program list, permission for controlling the to-be-controlled application program by the controlled device when the controlling device is in the network status.

In some embodiments, the first application program list is used to indicate an application program that the controlled device is allowed to control, or an application program that the controlled device is forbidden to control.

The first website list herein may include permission for various websites, access to which is supported by the management device, when the controlling device is in the network status, that is, one or more websites that the controlled device is allowed or forbidden to access when the controlling device is in the network status.

In some embodiments, the determining, by the management device based on the identification information of the to-be-accessed website and the first application program list, permission for controlling the to-be-controlled application program by the controlled device when the controlling device is in the network status has the following two specific implementations:

In an implementation, if the first website list is used to indicate a website that the controlled device is allowed to access when the controlling device is in the network status, when the to-be-controlled application is in the first website list, it is determined that the controlled device is allowed to access the to-be-accessed website; otherwise, it is determined that the controlled device is forbidden to access the to-be-accessed website.

In another implementation, if the first website list is used to indicate a website that the controlled device is forbidden to access when the controlling device is in the network status, when the to-be-controlled application is not in the first website list, it is determined that the controlled device is allowed to access the to-be-accessed website; otherwise, it is determined that the controlled device is forbidden to access the to-be-accessed website.

For example, if the controlled device is a mobile terminal and the network status of the controlling device is an offline state, permission (that is, the first website list) that is for an operation corresponding to the mobile terminal and that is configured for the mobile terminal when the controlling device is in the offline state includes an accessible website www.huawei.com. Assuming that a user accesses the Baidu website (www.baidu.com) by using the mobile terminal, when detecting an access operation performed by the user on the Baidu website, the mobile terminal may automatically generate a corresponding first request, and send the first request to the management device (for example, a palmtop computer), where the first request includes a device identifier of the mobile terminal and identification information about accessing the Baidu website.

After receiving the first request, the management device may determine, based on the determined first website list (allowed to access the Huawei website), that the mobile terminal has no permission for accessing the Baidu website. That is, the mobile terminal is not allowed to access the Baidu website. In this case, the procedure may be ended or corresponding prompt information may be sent to the mobile terminal. The prompt information is used to prompt the mobile terminal that access to the Huawei website is currently supported and access to another website is not allowed.

Step S704: The management device processes the first request based on the determined permission for performing the target operation by the controlled device. Herein, a specific implementation may be as follows: notifying, by the management device, the controlled device of the permission for accessing the to-be-accessed website by the controlled device; or sending, by the management device, a control instruction to the controlled device based on the permission for accessing the to-be-accessed website by the controlled device.

Correspondingly, after the management device processes the first request, the method may further include step S705: The controlled device accesses the to-be-accessed website based on the permission for the to-be-accessed website.

In a first implementation, the management device notifies the controlled device of the permission for accessing the to-be-accessed website by the controlled device. Correspondingly, the controlled device receives the permission for accessing the to-be-accessed website by the controlled device, and accesses the permission for the to-be-accessed website based on the permission.

Specifically, a radio frequency module of the management device may send a response message to the controlled device through a network, to notify the controlled device of the permission for accessing the to-be-accessed website. Correspondingly, a radio frequency module of the controlled device may receive the response message sent by the management device, and perform message parsing to learn of the permission for accessing the to-be-accessed website by the controlled device. If the controlled device has the permission for accessing the to-be-accessed website, a processor of the controlled device may continue to access the to-be-accessed website.

In a second implementation, the management device sends a control instruction to the controlled device based on the permission for accessing the to-be-accessed website by the controlled device, where the control instruction is used to instruct the controlled device to access the to-be-accessed website based on the permission for accessing the to-be-accessed website. Correspondingly, the controlled device receives the control instruction and executes the control instruction.

Specifically, after determining that the controlled device has the permission for accessing the to-be-accessed website, the management device may send a corresponding control instruction to the controlled device by using a radio frequency module, where the control instruction is used to instruct the controlled device to access the to-be-accessed website. Correspondingly, the radio frequency module of the controlled device may receive the control instruction sent by the management device, and access the to-be-accessed website in response to the control instruction and by using a processor.

In some embodiments, the management device may further determine, with reference to an access time of the to-be-accessed website, the permission for accessing the to-be-accessed website by the controlled device.

For example, it is assumed that the controlled device is a smart computer and the network status of the controlling device is an offline state. Operation permission of the smart computer that is correspondingly determined is shown in the following Table 9. Table 9 shows websites that are allowed to be used/accessed or websites that are forbidden to be used in various periods.

TABLE 9

| Operation period (available period) | Permission for performing an operation by a controlled device |
|---|---|
| 00:00-07:30 | Transaction-type websites are forbidden |
| 07:30-12:00 | Entertainment-type and trash-type websites are forbidden |
| 12:00-18:00 | Entertainment-type and trash-type websites are forbidden |
| 18:00-24:00 | All websites can be accessed |

It is assumed that a user accesses a game website at 14:30 on the smart computer, to log in to a game for entertainment. In this case, when detecting a login operation performed by the user on the game website, the smart device automatically generates a corresponding game access request, and sends the generated game access request to a management device (for example, a palmtop computer). The game access request includes information such as a game login operation time 14:30, a device identifier of the smart computer, and the game website that needs to be logged in to. As can be learned from the operation permission information of the smart computer shown in Table 9, 14:30 is within the permission operation period 12:00-18:00, and the period corresponding to 14:30 indicates that an entertainment-type website is forbidden to be accessed. That is, within the period of 12:00 to 18:00, the smart computer is not allowed to log in to and access the entertainment-type website, certainly including the game website. Therefore, the management device may determine that the smart computer has no permission for accessing the game website, and end the procedure or send corresponding prompt information to the smart computer. The prompt information is used to prompt the user that entertainment-type and trash-type websites are forbidden to be accessed within the period 12:00-18:00.

During implementation of the embodiments of the present invention, operation permission of the controlled device can be smartly managed, and some unpredictable consequences caused by a misoperation or an operation with inappropriate permission performed by a user on the controlled device can be avoided. For example, a child is prevented from accessing some inappropriate network information by accessing a network using the controlled device without adult control, thereby improving network use security of a device.

Figure 16:
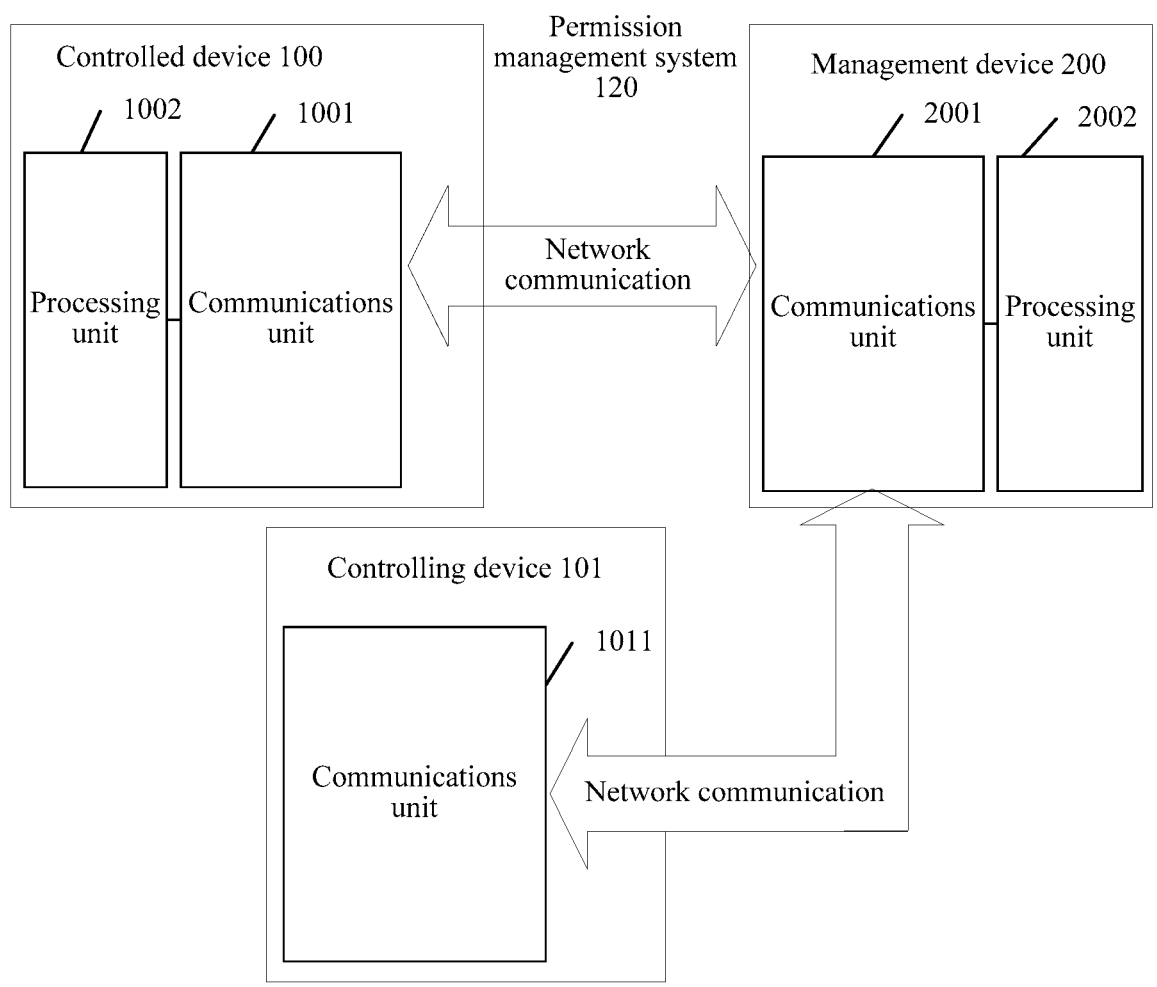
FIG. 16 is a functional block diagram of a permission management system according to an embodiment of the present invention.

The following describes a permission management system in an embodiment of the present invention. FIG. 16 is a functional architectural diagram of a permission management system according to an embodiment of the present invention. Functional blocks of the system may be hardware, software, or a combination of hardware and software to implement the solution of the present invention. A person skilled in the art should understand that the functional blocks shown in FIG. 16 may be combined or divided into several sub-blocks to implement the solution of the present invention. Therefore, content described above in the present invention can support any possible combination, division, or further definition of the following functional modules.

As shown in FIG. 16, the permission management system 120 includes a controlled device 100 and a management device 200. The management device may include a communications unit 2001 and a processing unit 2002.

The communications unit 2001 is configured to receive a first request sent by a controlled device, where the first request includes a device identifier of the controlled device and indication information of a target operation.

The processing unit 2002 is configured to detect a network status of a controlling device associated with the controlled device, where when the controlling device is in different network statuses, the controlled device has different permission for performing the target operation.

The processing unit 2002 is further configured to determine, based on the network status of the controlling device, the device identifier of the controlled device, and the indication information of the target operation, permission for performing the target operation by the controlled device The processing unit 2002 is further configured to process the first request based on the determined permission for performing the target operation by the controlled device.

Specifically, the communications unit 2001 may be a receiver or a transmitter, for example, the radio frequency module 216 in FIG. 3. The first request is used to request permission for instructing the controlled device to perform the target operation. Target operations corresponding to different application scenarios may be different, for example, an application program app control operation, a website access operation, and a device function control operation.

Specifically, the processor unit 2002 may be the processor 211 in FIG. 3. For how the processing unit 2002 determines the permission for performing the target operation by the controlled device, refer to descriptions of related content in the foregoing embodiments, and details are not described herein again.

Correspondingly, the controlled device may include a communications unit 1001 and a processing unit 1002.

The communications unit 1001 is configured to send a first request to the management device, where the first request includes a device identifier of the controlled device and indication information of a target operation, and is used to request permission for instructing the controlled device to perform the target operation.

The communication the unit 1001 is further configured to: receive the permission for performing the target operation by the controlled device that is notified by the management device, or receive a control instruction sent by the management device.

The processing unit 1002 is configured to: perform the target operation based on the permission for the target operation, or perform the target operation in response to the control instruction, based on the permission for the target operation.

Specifically, the communications unit 1001 may be a receiver or a transmitter, for example, the radio frequency module 116 in FIG. 2. The first request is used to request permission for instructing the controlled device to perform the target operation. Target operations corresponding to different application scenarios may be different, for example, an application program app control operation, a website access operation, and a device function control operation.

Specifically, the processor unit 1002 may be the processor 111 in FIG. 2. For how the processing unit 1002 performs the target operation based on the permission for the target operation, refer to descriptions of related content in the foregoing embodiments, and details are not described herein again.

Optionally, the permission management system may further include a controlling device 101, and the controlling device may include a communications unit 1011.

The communication the unit 1011 is configured to establish a communication connection to the management device.

The communication the unit 1011 is further configured to periodically report a heartbeat packet to the management device.

Specifically, the communications unit 1011 may be a receiver or a transmitter, for example, the radio frequency module 116 in FIG. 2. The communications unit 1011 of the controlling device may establish a communication connection to the management device, and may periodically report a heartbeat packet to the management device, so that the management device may determine, based on an interval at which the heartbeat packet is received, whether the network status of the controlling device is an online state or an offline state. For specifics, refer to related descriptions in the foregoing embodiments, and details are not described herein again.

In some embodiments, the communications unit in the management device, the controlling device, or the controlled device may be further configured to preconfigure, in the management device, the controlling device, one or more controlled devices, and permission for performing respective operations by the one or more controlled devices when the controlling device is in different network statuses.

The communications unit herein may be a display touchscreen such as the touchscreen shown in FIG. 2 or FIG. 3. Correspondingly, the touchscreen may be configured to receive first information entered by a user, where the first information is used to configure a controlling device, one or more controlled devices, and permission for performing respective operations by the one or more controlled devices when the controlling device is in different network statuses. That is, the first information is entered to configure, in the management device, corresponding information such as the controlling device, the one or more controlled devices, and permission for performing respective operations by the one or more controlled devices when the controlling device is in different network statuses. For how to enter the first information on the touchscreen, refer to descriptions of related content in the foregoing embodiments, and details are not described herein again.

In some embodiments, the processing unit 2002 is specifically configured to: detect whether the heartbeat packet reported by the controlling device is received within preset duration (for example, 5 minutes); and if yes, determine that the network status of the controlling device associated with the controlled device is an online state; or if not, determine that the network status of the controlling device associated with the controlled device is an offline state.

In some embodiments, when the management device supports a short-distance wireless communication protocol, the processing unit 2002 is specifically configured to: perform device scanning based on the short-distance wireless communication protocol, and generate a connected device list based on a device obtained by scanning; determine whether the controlling device associated with the controlled device is in a connected device list; and if yes, determine that the network status of the controlling device associated with the controlled device is an online state; or if not, determine that the network status of the controlling device associated with the controlled device is an offline state.

In some embodiments, when the management device is a device with a network connection detection function such as a router or a modem, the processing unit 2002 is specifically configured to: poll to determine whether the controlling device associated with the controlled device is in a current networked device list; and if yes, determine that the network status of the controlling device associated with the controlled device is in an online state; or if not, determine that the network status of the controlling device associated with the controlled device is in an offline state.

In some embodiments, after determining the permission for performing the target operation by the controlled device, the communications unit 2001 is further configured to notify the controlled device of the permission for performing the target operation by the controlled device.

In some embodiments, after determining the permission for performing the target operation by the controlled device, the communications unit 2001 is further configured to send a control instruction to the controlled device based on the determined permission for performing the target operation by the controlled device.

In some embodiments, the processing unit 2002 is specifically configured to determine, based on the device identifier of the controlled device and the network status of the controlling device, permission for performing various operations by the controlled device when the controlling device is in the network status; and the processing unit 2002 is further specifically configured to determine, in the permission for performing the various operations by the controlled device and based on the indication information of the target operation, the permission for performing the target operation by the controlled device when the controlling device is in the network status.

In some embodiments, the target operation is a website access operation, the indication information of the target operation includes identification information of a to-be-accessed website, and permission for performing the website access operation by the controlled device is represented by a first website list; and the processing unit 2002 is specifically configured to determine, based on the identification information of the to-be-accessed website and the first website list, permission for accessing the to-be-accessed website by the controlled device when the controlling device is in the network status, where the first website list is used to indicate a website that the controlled device is allowed to access when the controlling device is in the network status, or a website that the controlled device is forbidden to access when the controlling device is in the network status.

In some embodiments, the processing unit 2002 is specifically configured to: if the to-be-accessed website belongs to the first website list, determine that the controlled device is allowed to access the to-be-accessed website, where the first website list is used to indicate a website that the controlled device is allowed to access when the controlling device is in the network status; or the processing unit 2002 is specifically configured to: if the to-be-accessed website does not belong to the first website list, determine that the controlled device is allowed to access the to-be-accessed website, where the first website list is used to indicate a website that the controlled device is forbidden to access when the controlling device is in the network status.

In some embodiments, the target operation is an application program control operation, the indication information of the target operation includes identification information of a to-be-controlled application program, and permission for performing the application program control operation by the controlled device is represented by a first application program list; and the processing unit 2002 is specifically configured to determine, based on the identification information of the to-be-controlled application program and the first application program list, permission for controlling the to-be-controlled application program by the controlled device when the controlling device is in the network status, where the first application program list is used to indicate an application program that the controlled device is allowed to control when the controlling device is in the network status, or an application program that the controlled device is forbidden to control when the controlling device is in the network status.

In some embodiments, the processing unit 2002 is specifically configured to: if the to-be-accessed website belongs to the first application program list, determine that the controlled device is allowed to control the to-be-controlled application program, where the first application program list is used to indicate an application program that the controlled device is allowed to control when the controlling device is in the network status; or the processing unit 2002 is specifically configured to: if the to-be-accessed website does not belong to the first application program list, determine that the controlled device is allowed to control the to-be-controlled application program, where the first application program list is used to indicate an application program that the controlled device is forbidden to control when the controlling device is in the network status.

In some embodiments, the target operation is a device function control operation, and the indication information of the target operation includes identification information of a to-be-controlled device function; and the processing unit 2002 is specifically configured to determine, based on the identification information of the to-be-controlled device function and permission for various functions corresponding to the controlled device, permission for controlling the to-be-controlled device function by the controlled device when the controlling device is in the network status.

It may be understood that for specific implementations of the functional blocks included in the system 120 in FIG. 16, refer to the foregoing embodiments, and details are not described herein.

Figure 17:
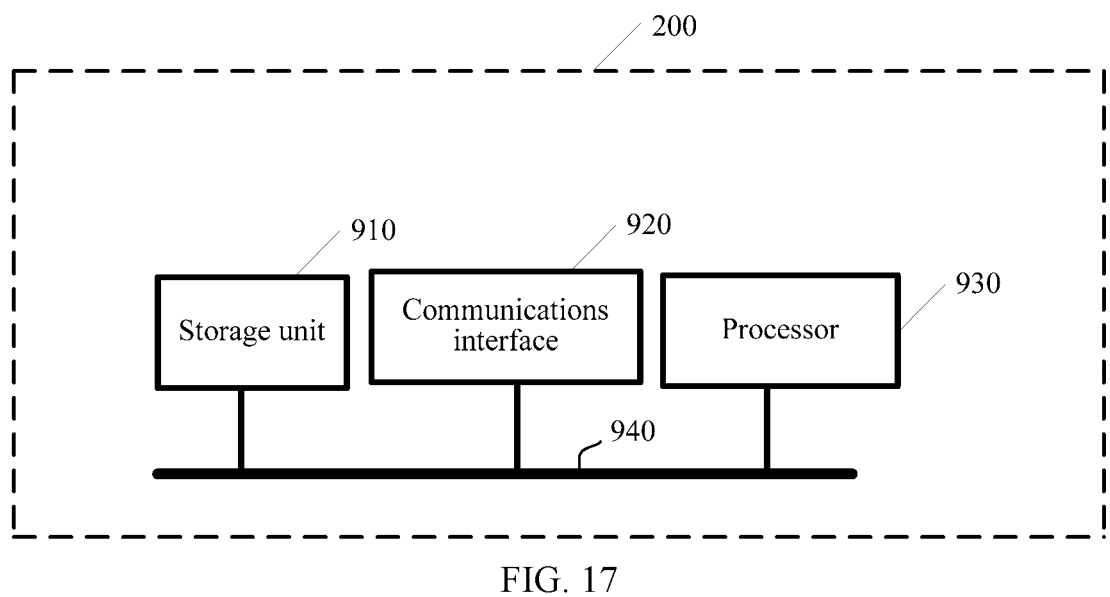
FIG. 17 is a schematic structural diagram of a management device according to an embodiment of the present invention.

FIG. 17 is a schematic structural diagram of a management device according to an embodiment of the present invention. The management device 200 may include a storage unit 910, a communications interface 920, and a processor 930 coupled to the storage unit 910 and the communications interface 920. The storage unit 910 is configured to store an instruction, the processor 920 is configured to execute the instruction, and the communications interface 920 is configured to communicate with another device under control of the processor 930. When executing the instruction, the processor 930 may perform any permission management method in the embodiments of this application based on the instruction.

The processor 930 may also be referred to as a central processing unit (CPU, Central Processing Unit). The storage unit 910 may include a read-only memory and a random access memory, and provide an instruction and data to the processor 930. A part of the storage unit 910 may further include a non-volatile random access memory. In a specific application, components of a wallpaper changing apparatus are coupled by using, for example, a bus system. The bus system may further include a power bus, a control bus, a status signal bus, and the like, in addition to a data bus. However, for a clear description, various types of buses in the figure are marked as a bus system 940. The methods disclosed in the foregoing embodiments of the present invention may be applied to a processor 930, or are implemented by the processor 930. The processor 930 may be an integrated circuit chip and has a signal processing capability. In an implementation process, steps in the foregoing methods can be implemented by using a hardware integrated logical circuit in a processor 90, or by using instructions in a form of software. The processor 930 may be a general-purpose processor, a digital signal processor, an application-specific integrated circuit, a field-programmable gate array or another programmable logic device, a discrete gate or transistor logic device, or a discrete hardware component. The processor 930 may implement or execute steps and logical block diagrams disclosed in the method embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is in the storage unit 910. For example, the processor 930 can read the instruction in the storage unit 910, and performs, based on the instruction, the method disclosed in the embodiments of this application.

It should be noted that the management device 200 shown in FIG. 17 may be the management device included in the permission management system in FIG. 16.

In conclusion, during implementation of the embodiments of the present invention, operation permission of the controlled device can be smartly managed, and some unpredictable consequences caused by a misoperation or an operation with inappropriate permission performed by a user on the controlled device can be avoided. For example, a child is prevented from accessing some inappropriate network information by accessing a network using the controlled device without adult control, thereby improving network use security of a device.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media, including but not limited to a disk memory, an optical memory, and the like, that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A permission management method, wherein the method comprises:

receiving, by a management device, a first request sent by a controlled device, wherein the first request comprises a device identifier of the controlled device and indication information of a target operation;

detecting, by the management device, a network status of a controlling device associated with the controlled device, wherein when the controlling device is in different network statuses, the controlled device has different permissions for performing the target operation;

determining, by the management device based on the network status of the controlling device, the device identifier of the controlled device, and the indication information of the target operation, a permission for performing the target operation by the controlled device, and wherein the determining, by the management device based on the network status of the controlling device, the device identifier of the controlled device, and the indication information of the target operation, permission for performing the target operation by the controlled device comprises:

determining, by the management device based on the device identifier of the controlled device and the network status of the controlling device, permission for performing various operations by the controlled device when the controlling device is in the network status; and determining, by the management device in the permission for performing the various operations by the controlled device and based on the indication information of the target operation, the permission for performing the target operation by the controlled device when the controlling device is in the network status, wherein the target operation is a website access operation, the indication information of the target operation comprises identification information of a to-be-accessed website, and permission for performing the website access operation by the controlled device is represented by a first website list and wherein the determining, by the management device in the permission for performing the various operations by the controlled device and based on the indication information of the target operation, the permission for performing the target operation by the controlled device when the controlling device is in the network status comprises:

determining, by the management device based on the identification information of the to-be-accessed website and the first website list, permission for accessing the to-be-accessed website by the controlled device when the controlling device is in the network status, wherein the first website list is used to indicate a website that the controlled device is allowed to access when the controlling device is in the network status, or a website that the controlled device is forbidden to access when the controlling device is in the network status; and processing, by the management device, the first request based on the determined permission for performing the target operation by the controlled device.

2. The method according to claim 1, wherein the processing, by the management device, the first request based on the determined permission for performing the target operation by the controlled device comprises:

notifying, by the management device, the controlled device of the permission for performing the target operation by the controlled device.

3. The method according to claim 1, wherein the processing, by the management device, the first request based on the determined permission for performing the target operation by the controlled device comprises:

sending, by the management device, a control instruction to the controlled device based on the determined permission for performing the target operation by the controlled device.

4. The method according to claim 1, wherein the determining, by the management device based on the identification information of the to-be-accessed website and the first website list, permission for accessing the to-be-accessed website by the controlled device when the controlling device is in the network status comprises:

determining that the controlled device is allowed to access the to-be-accessed website when the to-be-accessed website belongs to the first website list, wherein the first website list is used to indicate a website that the controlled device is allowed to access when the controlling device is in the network status; or determining that the controlled device is allowed to access the to-be-accessed website when the to-be-accessed website does not belong to the first website list, wherein the first website list is used to indicate a website that the controlled device is forbidden to access when the controlling device is in the network status.

5. The method according to claim 1, wherein the target operation is an application program control operation, the indication information of the target operation comprises identification information of a to-be-controlled application program, and permission for performing the application program control operation by the controlled device is represented by a first application program list; and the determining, by the management device in the permission for performing the various operations by the controlled device and based on the indication information of the target operation, the permission for performing the target operation by the controlled device when the controlling device is in the network status comprises:

determining, by the management device based on the identification information of the to-be-controlled application program and the first application program list, permission for controlling the to-be-controlled application program by the controlled device when the controlling device is in the network status, wherein the first application program list is used to indicate an application program that the controlled device is allowed to control when the controlling device is in the network status, or an application program that the controlled device is forbidden to control when the controlling device is in the network status.

6. The method according to claim 5, wherein the determining, by the management device based on the identification information of the to-be-controlled application program and the first application program list, permission for controlling the to-be-controlled application program by the controlled device when the controlling device is in the network status comprises:

determining that the controlled device is allowed to control the to-be-controlled application program when the to-be-controlled application program belongs to the first application program list, wherein the first application program list is used to indicate an application program that the controlled device is allowed to control when the controlling device is in the network status; or determining that the controlled device is allowed to control the to-be-controlled application program when the to-be-controlled application program does not belong to the first application program list, wherein the first application program list is used to indicate an application program that the controlled device is forbidden to control when the controlling device is in the network status.

7. The method according to claim 1, wherein the target operation is a device function control operation, and the indication information of the target operation comprises identification information of a to-be-controlled device function; and the determining, by the management device in the permission for performing the various operations by the controlled device and based on the indication information of the target operation, the permission for performing the target operation by the controlled device when the controlling device is in the network status comprises:

determining, by the management device based on the identification information of the to-be-controlled device function and permission for various functions corresponding to the controlled device, permission for controlling the to-be-controlled device function by the controlled device when the controlling device is in the network status.

8. A management device, wherein the management device comprises a receiver, a transmitter, a memory and a processor, wherein the memory comprises instructions that when executed by the processor, cause the management device to perform the following:

receiving a first request sent by a controlled device, wherein the first request comprises a device identifier of the controlled device and indication information of a target operation;

obtaining a network status of a controlling device associated with the controlled device, wherein when the controlling device is in different network statuses, the controlled device has different permissions for performing the target operation, and wherein the determining, by the management device based on the network status of the controlling device, the device identifier of the controlled device, and the indication information of the target operation, permission for performing the target operation by the controlled device comprises:

determining, by the management device based on the device identifier of the controlled device and the network status of the controlling device, permission for performing various operations by the controlled device when the controlling device is in the network status; and determining, by the management device in the permission for performing the various operations by the controlled device and based on the indication information of the target operation, the permission for performing the target operation by the controlled device when the controlling device is in the network status, wherein the target operation is a website access operation, the indication information of the target operation comprises identification information of a to-be-accessed website, and permission for performing the website access operation by the controlled device is represented by a first website list and wherein the determining, by the management device in the permission for performing the various operations by the controlled device and based on the indication information of the target operation, the permission for performing the target operation by the controlled device when the controlling device is in the network status comprises:
  determining, by the management device based on the identification information of the to-be-accessed website and the first website list, permission for accessing the to-be-accessed website by the controlled device when the controlling device is in the network status, wherein
  the first website list is used to indicate a website that the controlled device is allowed to access when the controlling device is in the network status, or a website that the controlled device is forbidden to access when the controlling device is in the network status;
  determining, based on the network status of the controlling device, the device identifier of the controlled device, and the indication information of the target operation, a permission for performing the target operation by the controlled device; and
  processing the first request based on the determined permission for performing the target operation by the controlled device.

9. The management device according to claim 8, wherein after determining the permission for performing the target operation by the controlled device, the instructions further cause the management device to perform the following:
  notifying the controlled device of the permission for performing the target operation by the controlled device.

10. The management device according to claim 8, wherein after determining the permission for performing the target operation by the controlled device, the instructions further cause the management device to perform the following:
  sending a control instruction to the controlled device based on the determined permission for performing the target operation by the controlled device.

11. A readable non-volatile storage medium for storing a computer instruction, wherein the computer instruction is executed by a terminal device to perform the following steps:
  receiving a first request sent by a controlled device, wherein the first request comprises a device identifier of the controlled device and indication information of a target operation;
  detecting a network status of a controlling device associated with the controlled device;
  and detecting a network status of a controlling device associated with the controlled device, wherein when the controlling device is in different network statuses, the controlled device has different permissions for performing the target operation;
  determining, based on a network status of the controlling device, the device identifier of the controlled device, and the indication information of the target operation, a permission for performing the target operation by the controlled device, and wherein the determining, by the management device based on the network status of the controlling device, the device identifier of the controlled device, and the indication information of the target operation, permission for performing the target operation by the controlled device comprises:
  determining, by the management device based on the device identifier of the controlled device and the network status of the controlling device, permission for performing various operations by the controlled device when the controlling device is in the network status; and
  determining, by the management device in the permission for performing the various operations by the controlled device and based on the indication information of the target operation, the permission for performing the target operation by the controlled device when the controlling device is in the network status, wherein the target operation is a website access operation, the indication information of the target operation comprises identification information of a to-be-accessed website, and permission for performing the website access operation by the controlled device is represented by a first website list and wherein the determining, by the management device in the permission for performing the various operations by the controlled device and based on the indication information of the target operation, the permission for performing the target operation by the controlled device when the controlling device is in the network status comprises:
  determining, by the management device based on the identification information of the to-be-accessed website and the first website list, permission for accessing the to-be-accessed website by the controlled device when the controlling device is in the network status, wherein
  the first website list is used to indicate a website that the controlled device is allowed to access when the controlling device is in the network status, or a website that the controlled device is forbidden to access when the controlling device is in the network status; and
  processing the first request based on the determined permission for performing the target operation by the controlled device.

12. The readable non-volatile storage medium according to claim 11, wherein the target operation is an application program control operation, the indication information of the target operation comprises identification information of a to-be-controlled application program, and permission for performing the application program control operation by the controlled device is represented by a first application program list; and wherein for determining the permission for performing the target operation by the controlled device when the controlling device is in the network status comprises:
  determining, based on the identification information of the to-be-controlled application program and the first application program list, permission for controlling the to-be-controlled application program by the controlled device when the controlling device is in the network status, wherein
  the first application program list is used to indicate an application program that the controlled device is allowed to control when the controlling device is in the network status, or an application program that the controlled device is forbidden to control when the controlling device is in the network status.

13. The readable non-volatile storage medium according to claim 12, wherein for determining permission for controlling the to-be-controlled application program by the controlled device when the controlling device is in the network status, the instructions cause the management device to perform the following:
  determining that the controlled device is allowed to control the to-be-controlled application program when the to-be-controlled application program belongs to the first application program list, wherein the first application program list is used to indicate an application program that the controlled device is allowed to control when the controlling device is in the network status; or determining that the controlled device is allowed to control the to-be-controlled application program when the to-be-controlled application program does not belong to the first application program list, wherein the first application program list is used to indicate an application program that the controlled device is forbidden to control when the controlling device is in the network status.

14. The readable non-volatile storage medium according to claim 11, wherein the target operation is a device function control operation, and the indication information of the target operation comprises identification information of a to-be-controlled device function; and wherein for determining permission for performing the target operation by the controlled device when the controlling device is in the network status, the instructions cause the management device to perform the following:

determining, based on the identification information of the to-be-controlled device function and permission for various functions corresponding to the controlled device, permission for controlling the to-be-controlled device function by the controlled device when the controlling device is in the network status.

* * * * *